(12) United States Patent
Kawakami et al.

(10) Patent No.: US 7,452,930 B2
(45) Date of Patent: Nov. 18, 2008

(54) CURABLE COMPOSITION

(75) Inventors: Atsushi Kawakami, Takasago (JP); Katsuhiro Ando, Akashi (JP)

(73) Assignee: Kaneka Corporation, Osaka (JP)

( * ) Notice: Subject to any disclaimer, the term of this patent is extended or adjusted under 35 U.S.C. 154(b) by 431 days.

(21) Appl. No.: 11/256,114

(22) Filed: Oct. 24, 2005

(65) Prior Publication Data

US 2006/0089432 A1 Apr. 27, 2006

(30) Foreign Application Priority Data

Oct. 25, 2004 (JP) ............................. 2004-310129
Mar. 18, 2005 (JP) ............................. 2005-079291

(51) Int. Cl.
*C08L 95/00* (2006.01)

(52) U.S. Cl. ............................. 524/70; 524/59; 524/68; 524/71

(58) Field of Classification Search .................. 524/59, 524/68–71
See application file for complete search history.

(56) References Cited

U.S. PATENT DOCUMENTS 5,925,695 A * 7/1999 Ohtsuka et al. ................ 524/68
6,479,584 B1 * 11/2002 Nakagawa et al. .......... 525/100

2002/0058053 A1 5/2002 Nakanishi et al.
2005/0107499 A1 5/2005 Georgeau et al.
2005/0171276 A1 * 8/2005 Matsuda et al. ............. 524/572

FOREIGN PATENT DOCUMENTS

| JP | 10-279808 | 10/1998 |
|----|-----------|---------|
| JP | 2001-55307 | 2/2001 |
| JP | 2002-338683 | 11/2002 |
| JP | 2004-161889 | 6/2004 |
| JP | 2004-292611 | 10/2004 |
| WO | WO 00/37534 | 6/2000 |

OTHER PUBLICATIONS

International Search Report, dated Jan. 17, 2006 of PCT/JP2005/019339.
International Preliminary Report on Patentability dated May 1, 2007 of PCT/JP2005/019339.

* cited by examiner

*Primary Examiner*—Peter Szekely
(74) *Attorney, Agent, or Firm*—Westerman, Hattori, Daniels & Adrian, LLP.

(57) ABSTRACT

It is the subject of the present invention to provide a solvent-free ambient-temperature curable composition, excellent in water-resistant adhesion, storage stability and curability, and generates neither smoke nor odor when working therewith. The relevant problem is solved by a curable composition including (A) a natural asphalt and/or petroleum asphalt, (B) a polyoxyalkylene polymer having one or more reactive silicon groups capable of cross-linking by forming siloxane bonds through silanol condensation reaction.

49 Claims, No Drawings

CURABLE COMPOSITION

BACKGROUND OF THE INVENTION

1. Field of the Invention

The present invention relates to a curable composition including a natural asphalt and/or a petroleum asphalt and a reactive silicon group-containing polyoxyalkylene polymer. Additionally, the present invention relates to an adhesive for tile, a waterproof material, a road pavement material, a sealant and a damping material including such a curable composition.

2. Description of the Related Art

Asphalt is excellent in tackiness, workability, waterproof property, and low in price, and hence is widely used as an easy-to-use material in the fields of the road pavement material, roofing material, sealant, adhesive, canal lining material, damping material, soundproof material and the like.

For example, when asphalt is used as a roofing material, a so-called heat method of asphalt waterproofing construction has hitherto been actively used as the main method of waterproofing work in which a plurality of asphalt sheets are laminated to form a waterproof layer. Although this construction method is extremely high in waterproof reliability, this method is avoided in residential areas and city center because this method has such a drawback that when asphalt is melted, smoke and odor are heavily generated from the melted asphalt to seriously pollute the environment surrounding the site concerned. Accordingly, the areas in which this method can be adopted are limited. Additionally, this method involves the danger of burning workmen, so that workmen tend to avoid this method.

For the purpose of overcoming these problems, the autohesion method, a cold construction method, has been being established in the filed concerned; however, release paper peeled off when construction is undertaken is generated in abundance as waste material to provoke a serious problem of disposal thereof.

Now, turning to the investigation of the performance, in general blown asphalt subjected to air blowing treatment is used in application as roofing material; however, blown asphalt is often brittle and tends to crack at low temperatures because of the breakdown of the material due to ambient temperature and the hardness of the material. On the contrary, such asphalt as exhibiting satisfactory low-temperature properties sometimes exhibits intolerable fluidity or deformation in summer. For the purpose of overcoming such problems, an epoxy resin-asphalt materials and the like have been developed to overcome the formation of furrows in summer by imparting strength; however, such a drawback that cracks are generated in winter has not yet been solved.

Recently, for the purpose of overcoming cracking, an attempt has been made in which a rubber modifier such as natural rubber, styrene/butadiene rubber and chloroprene rubber is added to impart elasticity (for example, see Patent Document 1). However these rubber modifiers are poorly compatible with asphalt, so that a homogeneous composition can hardly be obtained; dispersion of such modifiers requires a long-time stirring under heating at a high temperature. Thus, modification of asphalt effected by the rubber modifiers tends to be insufficient, resulting in insufficient adhesion to the base material causing unsatisfactory waterproof/water-blocking performance.

[Patent Document 1] Japanese Patent Laid-Open No. 10-279808.

SUMMARY OF THE INVENTION

The problem to be solved by the present invention is the provision of an ambient-temperature curable asphalt composition which generates neither smoke nor odor when applied to construction, does not involve solvent volatilization, and is satisfactory in water resistant adhesion to mortar.

For the purpose of solving the above described problems, the present inventors have made diligent investigations, and consequently perfected the present invention by discovering that a curable composition capable of solving the above described problems can be obtained by including a reactive silicon group-containing polyoxyalkylene polymer in natural asphalt and/or petroleum asphalt.

More specifically, the present invention provides the following (1) to (31).

(1) A curable composition including (A) a natural asphalt and/or petroleum asphalt, and (B) a polyoxyalkylene polymer having one or more reactive silicon groups represented by the following general formula (1):

wherein $R^1$ represents an alkyl group having 1 to 20 carbon atoms, an aryl group having 6 to 20 carbon atoms, an aralkyl group having 7 to 20 carbon atoms or a triorganosiloxy group represented by $(R'O)_3Si—$, where, when two $R^1$s are present, they may be the same or different, and R' is a monovalent hydrocarbon group having 1 to 20 carbon atoms, and three R's may be the same or different; X represents a hydroxy group or a hydrolyzable group, where, when two or more Xs are present, they may be the same or different; and a represents 1, 2 or 3.

(2) The curable composition according to (1), wherein the main chain skeleton of the (B) component is polyoxypropylene.

(3) The curable composition according to (1) or (2), wherein the introduction ratio (as derived from $^1$H-NMR analysis) of the reactive silicon group introduced into the molecular terminals of the (B) component is 60% or more, and the number average molecular weight (based on GCP analysis, relative to the polystyrene standard) of the (B) component is 5,000 or more.

(4) The curable composition according to any one of (1) to (3), including a (G) silane coupling agent.

(5) The curable composition according to (4), wherein the (G) component is a silane coupling agent containing one or more amino groups per molecule.

(6) The curable composition according to (3), wherein the introduction ratio (as derived from $^1$H-NMR analysis) of the reactive silicon group introduced into the molecular terminals of the (B) component is 75% or more. (7) The curable composition according to (3), wherein the (B) component is a mixture composed of a reactive silicon group-containing polyoxyalkylene polymer having an introduction ratio (as derived from $^1$H-NMR analysis) of the reactive silicon group introduced into the molecular terminals thereof equal to 75% or more and less than 85% and a reactive silicon group-containing polyoxyalkylene polymer having an introduction ratio (as derived from $^1$H-NMR analysis) of the reactive silicon group introduced into the molecular terminals thereof is 85% or more. (8) The curable composition according to (3), wherein the introduction ratio (as derived from $^1$H-NMR analysis) of the reactive silicon group introduced into the molecular terminals of the (B) component is 85% or more. (9) The curable composition according to (3), wherein the number average molecular weight (based on GPC analysis, relative to polystyrene standard) of the (B) component is 10,000 or more.

(10) The curable composition according to any one of (1) to (9), wherein the (B) component has one or more reactive silicon groups represented by the following general formula (2) and/or the following general formula (3):

$$—Si(R^1)X_2 \quad (2)$$

where $R^1$ and X are the same as described above, and $$—SiX_3 \quad (3)$$

where X is the same as described above.

(11) The curable composition according to any one of (1) to (10), wherein the (B) component has one or more groups represented by the following general formula (4):

$$—NR^2—C(=O)— \quad (4)$$

where $R^2$ is a hydrogen atom, an alkyl group having 1 to 20 carbon atoms, an aryl group having 6 to 20 carbon atoms, or an aralkyl group having 7 to 20 carbon atoms.

(12) The curable composition according to (11), wherein the (B) component has at least two groups represented by the general formula (4) per molecule.

(13) The curable composition according to any one of (1) to (12), including (C) a plasticizer.

(14) The curable composition according to (13), wherein the (C) component plasticizer is an aromatic oligomer or a completely or partially hydrogenated product of the aromatic oligomer.

(15) The curable composition according to (13), wherein the (C) component plasticizer is a sulfonate compound or a sulfonamide compound.

(16) The curable composition according to any one of (1) to (15), including a (D) epoxy resin.

(17) The curable composition according to (16), wherein the content of the (D) component epoxy resin is 5 to 120 parts by weight in relation to 100 parts by weight of the (A) component.

(18) The curable composition according to any one of (1) to (17), including an (E) alkyl (meth)acrylate polymer.

(19) The curable composition according to (18), wherein the molecular chain of the (E) component alkyl (meth)acrylate polymer is a copolymer including (a) alkyl (meth)acrylate monomer units having an alkyl group having 1 to 8 carbon atoms and (b) alkyl (meth)acrylate monomer units having an alkyl group having 10 or more carbon atoms.

(20) The curable composition according to (18) or (19), wherein the (E) component alkyl (meth)acrylate polymer is a polymer having one or more reactive silicon groups represented by the above described general formula (1)

(21) The curable composition according to any one of (1) to (20), including an (F) tackifier resin.

(22) The curable composition according to (21), wherein the (F) tackifier resin is a tackifier resin modified with phenol and/or alkylphenol.

(23) The curable composition according to (21) or (22), wherein when the sum of the contents of the (A), (B), (C) and (F) components is represented as 100 parts by weight, the contents of the (A), (B), (C) and (F) components are 30-60, 25-55, 15-50 and 1-30 parts by weight, respectively.

(24) The curable composition according to any one of (1) to (23), wherein 10 parts by weight or less of asphaltene is contained in 100 parts by weight of the (A) component.

(25) The curable composition according to any one of (1) to (24), wherein the curable composition is cured by aging at 23° C. for 3 days and then at 50° C. for 4 days to form a 3-mm thick sheet-like specimen, and the specimen is subjected to a tensile test in compliance with JIS K 6251, resulting in a tensile strength at break of 0.4 MPa or more and an elongation at break of 50% or more.

(26) A one-component curable composition, including the curable composition according to any one of (1) to (25).

(27) An adhesive for tile, including the curable composition according to any one of (1) to (26).

(28) A waterproof material, including the curable composition according to any one of (1) to (26).

(29) A road pavement material, including the curable composition according to any one of (1) to (26).

(30) A sealant, including the curable composition according to any one of (1) to (26).

(31) A damping material, including the curable composition according to any one of (1) to (26).

By use of the curable composition of the present invention, it is possible to provide a curable composition excellent in water resistance, curability and storage stability, and does not need heat melting and does not generate smoke and odor when used for construction.

DETAILED DESCRIPTION OF THE PREFERRED EMBODIMENTS

The natural asphalt and/or the petroleum asphalt used as the (A) component in the present invention is natural asphalts such as lake asphalts including Trinidad epure, gilsonite and pyrobitumen and such as rock asphalt; cut-back asphalts of these natural asphalts; and petroleum asphalts such as straight asphalt and blown asphalt produced by oil refining process. The (A) component may be a mixture with substances such as petroleum process oils obtained by applying treatments including extraction, purification and hydrogenation to heavy catalytically cracked cycle oil, light catalytically cracked cycle oil, lubricating oil, and distillates of these oils and other distillates. In particular, straight asphalt produced by the oil refining process is preferable because it is compatible with the (B) component or can attain stable dispersibility with the (B) component. Moreover, the content of asphaltene constituting the asphalt component is preferably 10 parts by weight or less in 100 parts by weight of asphalt.

The asphaltene content in the asphalt component may be measured on the basis of a composition analysis method of asphalt using column chromatography (Japan Petroleum Institute Code, JPI-5S-22-83).

Coal tar produced by the coal refining process is classified into the bitumen similarly to the above described asphalts, but it is not preferable because it contains harmful benzopyrene and generates odor when working therewith.

As the main chain skeleton of the (B) reactive silicon group-containing polyoxyalkylene polymer, a main chain skeleton may be cited which has a repeating unit essentially represented by the general formula (5):

$$—R^3—O— \quad (5)$$

where $R^3$ is a divalent organic group, and represents a straight-chain or branched alkylene group having 1 to 14 carbon atoms.

Specific examples of the repeating unit represented by the general formula (5) include —$CH_2CH_2O$—, —$CH(CH_3)CH_2O$—, —$CH(C_2H_5)CH_2O$—, —$C(CH_3)_2CH_2O$—, and —$CH_2CH_2CH_2CH_2O$—.

The main chain skeleton of the polyoxyalkylene polymer may be constituted with only one type of repeating unit or with two or more types of repeating units. In particular, the —CH(CH$_3$)CH$_2$O— repeating unit is preferable because the polyoxypropylene constituted with this repeating unit is amorphous, and this repeating unit can make a polymer low in viscosity to an appropriate extent and can give an appropriate flexibility to a cured substance.

Examples of the synthesis method of the polyoxyalkylene polymer include a polymerization method based on an alkaline catalyst such as KOH; a polymerization method based on a transition metal compound-porphyrin complex catalyst prepared by reacting an organoaluminum compound with porphyrin, disclosed in Japanese Patent Laid-Open No. 61-215623; polymerization methods based on composite metal cyanide complex catalysts, disclosed in Japanese Patent Publication Nos. 46-27250 and 59-15336, and U.S. Pat. Nos. 3,278,457, 3,278,458, 3,278,459, 3,427,256, 3,427,334, 3,427,335 and the like; a polymerization method using a catalyst composed of a polyphosphazene salt disclosed in Japanese Patent Laid-Open No. 10-273512, and a polymerization method using a catalyst composed of a phosphazene compound disclosed in Japanese Patent Laid-Open No. 11-060722. However, the method concerned is not limited to these methods.

The reactive silicon group in the (B) reactive silicon group-containing polyoxyalkylene polymer is a group which has one or more hydroxy or hydrolyzable groups bonded to the silicon atom thereof and is capable of forming siloxane bonds by a reaction catalyzed with a silanol condensation catalyst. As a reactive silicon group, a group represented by the following general formula (1) may be cited:

$$—Si(R^1{}_{3-a})X_a \quad (1)$$

where $R^1$ represents an alkyl group having 1 to 20 carbon atoms, an aryl group having 6 to 20 carbon atoms, an aralkyl group having 7 to 20 carbon atoms, or a triorganosiloxy group represented by $(R')_3OSi—$; when two $R^1$s are present, they may be the same or different; R' represents a monovalent hydrocarbon group having 1 to 20 carbon atoms, and three R's may be the same or different; X represents a hydroxy or hydrolyzable group; when two or more Xs are present, they may be the same or different; and a represents 1, 2 or 3.

When Xs in the above described general formula (1) are hydrolyzable groups, they are not particularly limited and may be any hydrolyzable groups well known in the art. Specific examples of the hydrolyzable groups include a hydrogen atom, a halogen atom, an alkoxy group, an acyloxy group, a ketoxymate group, an amino group, an amide group, an acid amide group, an aminooxy group, a mercapto group and an alkenyloxy group. Among these groups, particularly preferable are alkoxy groups such as a methoxy group, an ethoxy group, a propoxy group and an isopropoxy group from the viewpoints of moderate hydrolyzability and easy handlability.

In the general formula (1), $R^1$ is not particularly limited, and may be such groups as well known in the art; specific examples include alkyl groups such as a methyl group, an ethyl group, a propyl group and an isopropyl group; aryl groups such as a phenyl group; and aralkyl groups such as a benzyl group. Among these groups, a methyl group is particularly preferable from the viewpoint of raw material availability.

The reactive silicon group represented by the general formula (1) is not particularly limited and may be such groups as well known in the art; specific examples include a methyldimethoxysilyl group, a methyldiethoxysilyl group, a methyldiisopropoxysilyl group, a trimethoxysilyl group, a triethoxysilyl group and a triisopropoxysilyl group.

The introduction of the reactive silicon group into a polyoxyalkylene polymer may be carried out on the basis of methods well known in the art. For example, the following methods may be cited.

(a) With an organic polymer having in the molecule functional groups such as hydroxy groups, an organic compound having an active group exhibiting reactivity to the functional groups and an unsaturated group is reacted, to yield an unsaturated group-containing organic polymer. Alternatively, an unsaturated group-containing organic polymer is obtained by copolymerization of monomers having unsaturated groups uninvolved in the polymerization reaction in such a way that an unsaturated group-containing organic polymer is obtained by ring-opening copolymerization of unsaturated group-containing epoxides, for example, when an organic polymer is obtained by ring-opening polymerization of epoxides. Then, a reactive silicon group-containing hydrosilane is reacted with the reaction product to be hydrosilylated.

(b) With an unsaturated group-containing organic polymer, obtained similarly to the method described in (a), a mercapto group- and reactive silicon group-containing compound is reacted.

(c) With an organic polymer having in the molecule functional groups such as hydroxy groups, epoxy groups and isocyanate groups, a compound having a functional group exhibiting reactivity to the functional groups and a reactive silicon group is reacted.

Among the above described methods, the method (a) or (c) is preferable because an organic polymer obtained by the method (b) is strong in odor due to mercaptosilane.

A method belonging to the method (c) in which a hydroxy group-terminated polymer is reacted with an isocyanate group- and reactive silicon group-containing compound is preferable because the method provides a high conversion rate for a relatively short reaction time. The oxyalkylene polymer obtained by such a reaction is a polymer having, in addition to the reactive silicon groups, a group represented by the following general formula (4):

$$—NR^2—C(=O)— \quad (4)$$

where $R^2$ represents a hydrogen atom, an alkyl group having 1 to 20 carbon atoms, an aryl group having 6 to 20 carbon atoms or an aralkyl group having 7 to 20 carbon atoms.

It is to be noted that the (B) component having the groups represented by the general formula (4) can be obtained by methods other than the above described method. Specific examples include a (B) component having two or more groups represented by the general formula (4) irrespective of the method for introducing the reactive silicon group, the (B) component being obtained by the chain-elongation reaction between the polyols having the repeating units represented by the general formula (5) and diisocyanate compounds covering aromatic polyisocyanates such as toluene(tolylene) diisocyanate, diphenylmethane diisocyanate and xylene diisocyanate, and aliphatic polyisocyanates such as isophorone diisocyanate and hexamethylene diisocyanate.

As for the method for introducing the reactive silicon group, the method (a) and the method (c) have merits and demerits. A reactive silicon group-containing organic polymer obtained by the method (a) is preferable in that it gives a composition lower in viscosity and better in workability than that given by a polymer obtained by the method (c). On the other hand, the method (c) is preferable in that it can introduce a silyl group into a hydroxy group-containing polymer in a one-step manner, and accordingly, can prepare the (B) component in a satisfactory productivity.

The number of the group represented by the general formula (4) is preferably one or more per molecule, and more preferably two or more per molecule.

In the method (a), for the purpose of introducing the reactive silicon group with a high introduction ratio, it is preferable that the introduction is carried out by addition of a hydrosilane compound to an organic polymer having an unsaturated group represented by $CH_2=C(R^4)—CH_2—$ or $CH(R^4)=CH_2—CH_2—$ (where $R^4$ represents a hydrogen atom or a hydrocarbon group having 1 to 10 carbon atoms). More preferably, $R^4$ is a hydrogen atom or a methyl group; for the purpose of making the introduction ratio of the reactive silicon group be 85% or more, it is particularly important for $R^4$ to be a methyl group.

Specific examples of the hydrosilane compound used in the method (a) include halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; and ketoximatesilanes such as bis(dimethylketoximate)methylsilane and bis(cyclohexylketoximate)methylsilane; however, the hydrosilane compound concerned is not limited to these compounds. Among these examples, particularly halogenated silanes and alkoxysilanes are preferable; in particular, alkoxysilanes are most preferable because the obtained compositions are moderately hydrolyzable and easily handlable.

Examples of the synthesis method (b) include a method in which a mercapto group- and reactive silicon group-containing compound is introduced into the sites on the unsaturated bonds of an organic polymer by means of a radical addition reaction in the presence of a radical initiator and/or a radical generating source; however, the synthesis method concerned is not limited to these methods. Examples of the above described mercapto group- and reactive silicon group-containing compound include γ-mercaptopropyltrimethoxysilane, γ-mercaptopropylmethyldimethoxysilane, γ-mercaptopropyltriethoxysilane and γ-mercaptopropylmethyldiethoxysilane; however, the compound concerned is not limited to these compounds.

Examples of the method, of the methods described in (c), in which a hydroxy-terminated polymer is reacted with an isocyanate group- and reactive silicon group-containing compound include a method disclosed in Japanese Patent Laid-Open No. 3-47825; however, the method concerned is not limited to these methods. Examples of the above described isocyanate group- and reactive silicon group-containing compound include γ-isocyanatepropyltrimethoxysilane, γ-isocyanatepropylmethyldimethoxysilane, γ-isocyanatepropyltriethoxysilane, and γ-isocyanatepropylmethyldiethoxysilane; however, the compound concerned is not limited to these compounds.

The (B) component may be a straight chain or may have branches, and the number average molecular weight thereof, measured by gel permeation chromatography (GPC), relative to polystyrene standard, is preferably 3,000 or more, practically 100,000 or less, more preferably 5,000 or more and 70,000 or less, and further preferably 10,000 or more and 50,000 or less. When the number average molecular weight is less than 5,000, there is found an adverse trend involving a high hardness of the composition, while when the number average molecular weight exceeds 70,000, there is found an adverse trend involving the workability because the viscosity becomes high.

The reactive silicon groups in the (B) component may be bonded to the terminals or to the inner portion of the polyoxyalkylene polymer, or both in the terminals and the inner portion. Particularly preferably, when the reactive silicon groups are bonded only to the molecular terminals, the network of the polymer component contained in the composition is efficiently constructed, and hence a small amount of the reactive silicon group makes it possible to form an effective content of network.

Among the possible methods for measuring the introduction ratio of the reactive silicon group in the (B) component, there is a $^1$H-NMR spectral method which can give the introduction ratio as derived from the integrated spectral intensity involving the terminals having the reactive silicon groups introduced thereinto. The introduction ratio of the reactive silicon group means the percentage value derived from the number of the reactive silicon groups present in the molecule divided by the number of the molecular terminals. In other words, the introduction ratio in the case of a straight chain polymer (namely a polymer having two molecular terminals) having on average two reactive silicon groups per molecule is derived to be 100%. Accordingly, in the case of a polymer having many reactive silicon groups on the sites other than the terminals, the calculated value of the introduction ratio exceeds 100% as the case may be.

The introduction ratio of the reactive silicon group in the (B) component is preferably 60% or more, more preferably 75% or more, and furthermore preferably 85% or more. When the introduction ration is less than 60%, the cross-linking of the (B) component in the curable composition of the present invention becomes insufficient, and there is a fear to lead to an insufficient strength of the cured substance. On the other hand, an embodiment is recommended in which there is used a admixture composed of a polymer having an introduction ratio of the reactive silicon group of 85% or more and a polymer having an introduction ratio of 75% or more and less than 85%.

The number of the reactive silicon groups per molecule of the (B) component polymer is preferably on average one or more, and preferably 1.1 to 5. When the number of the reactive silicon groups contained in the molecule is less than 1, the curability of the cured substance becomes insufficient, no satisfactory rubber elasticity is attained as the case may be, while the number of the groups concerned exceeds 5, unpreferably the cured substance becomes hard and brittle, and the rubber elasticity becomes poor.

The used amount of the (B) component is 10 to 500 parts by weight, more preferably 10 to 300 parts by weight, and particularly preferably 30 to 200 parts by weight, in relation to 100 parts by weight of the (A) component.

The reactive silicon group represented by the general formula (1) has one to three hydroxy groups or hydrolyzable groups represented by X, but when the reactive silicon group has one hydroxy or hydrolyzable group, the curability tends to be insufficient; accordingly, the reactive silicon group represented by the following formula (2) or (3) is preferable:

$$—Si(R^1)X_2 \qquad (2)$$

where $R^1$ and Xs are the same as described above, $$—SiX_3 \qquad (3)$$

where Xs are the same as described above.

Particularly, it is preferable to use as the (B) component a polymer having one or more reactive silicon groups represented by the general formula (3), for the purpose of requiring a high curability for the curable composition and/or the creep resistance for the cured substance.

A plasticizer (C) usable in the present invention is not limited and a known plasticizer can be used. Specific examples of the (C) plasticizer include phthalates such as dibutyl phthalate, diheptyl phthalate, di(2-ethylhexyl) phthalate, butyl benzyl phthalate, di-n-octyl phthalate, diisononyl phthalate, diisodecyl phthalate and diundecyl phthalate; non-aroamtic dibasic acid esters such as di(2-ethylhexyl) adipate, di-n-octyl adipate, diisononyl adipate, diisodecyl adipate, di(2-ethylhexyl) sebacate and di-2-ethylhexyl tetrahydrophthalate; process oils such as paraffin base oil, naphthene base oil and aroma base oil; fatty acid oils such as flaxseed oil, soybean oil and wood oil; aromatic esters such as tri-2-ethylhexyl trimellitate and triisodecyl trimellitate; fatty acid esters such as butyl oleate, methyl acetylrecinoleate and pentaerythritol ester; polyvinyl oligomers such as polybutene, hydrogenated polybutene and hydrogenated α-olefin oligomer; hydrogenated polybutadiene oligomers such as hydrogenated liquid polybutadiene; paraffins such as paraffin oil and chlorinated paraffin oil; cycloparaffins such as naphthene oil; aromatic oligomers such as biphenyl and triphenyl; completely or partially hydrogenated aromatic oligomers; sulfonate compounds such as phenyl alkyl sulfonate; and sulfonamide compounds such as toluene sulfonamide, N-ethyltoluene sulfonamide, and N-cyclohexyltoluene sulfonamide. These compounds may be used each alone or in combinations of two or more thereof.

Addition of the (C) plasticizer makes the viscosity of the composition lower and the workability better. Aromatic oligomers, completely or partially hydrogenated aromatic oligomers, sulfonate compounds, and sulfonamide compounds are preferable since they tend to notably increase the dispersion stability of the component (A) and the component (B).

When the (C) component is contained, the used amount of the (C) component is preferably 5 to 300 parts by weight, more preferably 10 to 200 parts by weight, and most preferably 25 to 120 parts by weight in relation to 100 parts by weight of the (A) component. When the used amount of the (C) component is less than 5 parts by weight, the effect of decreasing the viscosity of the composition, and the improvement effects of the compatibility and the dispersibility of the (A) and (B) components sometimes are insufficient. When the used amount of the (C) component exceeds 300 parts by weight, sufficient mechanical properties sometimes cannot be obtained.

To the curable composition of the present invention, (D) an epoxy resin may be added according to need. Addition of an epoxy resin increases the strength of the cured substance, and the formation of furrows in summer and the like are expected to be overcome, and water resistant adhesion to substrates such as mortar is improved. Examples of the (D) epoxy resin include epichlorohydrin-bisphenol A-type epoxy resins, epichlorohydrin-bisphenol F-type epoxy resins, flame resistant epoxy resins such as glycidyl ether of tetrabromobisphenol A, novolac-type epoxy resins, hydrogenated bisphenol A-type epoxy resins, epoxy resins of the type of glycidyl ether of bisphenol A propyleneoxide adduct, p-oxybenzoic acid glycidyl ether ester-type epoxy resins, m-aminophenol epoxy resins, diaminodiphenylmethane epoxy resins, urethane modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ethers of polyhydric alcohols such as glycerin, hydantoin-type epoxy resins and epoxidized substances of unsaturated polymers such as petroleum resins; however the epoxy resin is not limited to these examples, and commonly used epoxy resins can be used. Epoxy resins having at least two epoxy groups per molecule are preferable because such epoxy resins are high in reactivity when curing is made, and the cured substances can easily form three dimensional networks. Examples of further preferable epoxy resins include bisphenol A-type epoxy resins or novolac-type epoxy resins.

When the (D) component is added, the used proportion of the (D) component is preferably 5 to 120 parts by weight, more preferably 5 to 100 parts by weight, and particularly, most preferably 20 to 100 parts by weight in relation to 100 parts by weight of the (A) component. When the used amount of the (D) component exceeds 120 parts by weight, the storage stability tends to be insufficient. On the other hand, when the used amount of the (D) component is less than 5 parts by weight, there is a fear that the strength improvement intended to be achieved by the addition of the (D) component is not attained.

When the (D) epoxy resin is added to the composition of the present invention, a curing agent to cure the epoxy resin may be used simultaneously. No particular constraint is imposed on the usable epoxy resin curing agent, and epoxy resin curing agents well know in the art can be used. Specific examples of the epoxy resin curing agent include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and polyether with amine terminal groups; tertiary amines such as 2,4,6-tris(dimethylaminomethyl)phenol and tripropylamine, and salts of the tertiary amines; polyamide resins; imidazoles; dicyandiamides; borontrifluoride complexes; carboxylic acid anhydrides such as phthalic anhydride, hexahydrophthalic anhydride, tetrahydrophthalic anhydride, dodecynylsuccinic anhydride, pyromellitic anhydride and chlorendic anhydride; alcohols; phenols; carboxylic acids; and diketone complexes of aluminum or zirconium. However, the epoxy resin curing agent is not limited to these examples. Additionally, the curing agents may be used either each alone or in combinations of two or more thereof.

When an epoxy resin curing agent is used, the used amount of the curing agent is preferably 0.1 to 300 parts by weight in relation to 100 parts by weight of the epoxy resin.

As an epoxy resin curing agent, a ketimine compound can be used. A ketimine compound is stable when no moisture is present, but moisture decomposes the ketimine compound into a primary amine and a ketone; the thus produced primary amine acts as a room temperature curable curing agent to cure the epoxy resin. Use of a ketimine compound makes it possible to obtain a one-component composition. Such a ketimine compound may be obtained by condensation reaction between an amine compound and a carbonyl compound.

For the synthesis of a ketimine compound, an amine compound and a carbonyl compound well known in the art may be used. For example, the following compounds can be used as such an amine compound: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyamines such as 1,2,3-triaminopropane, triaminobenzene, tris(2-aminoethyl)amine and tetra(aminomethyl)methane; polyalkylenepolyamines such as diethylenetriamine, triethylenetriamine and tetraethylenepentamine; polyoxyalkylene polyamines; and aminosilanes such as γ-aminopropyltriethoxysilane, N-(β-aminoethyl)-γ-aminopropyltrimethoxysilane and N-(β-aminoethyl)-γ-aminopropylmethyldimethoxysilane. Additionally, the following compounds can be used as such a carbonyl compound: aldehydes such as acetoaldehyde, propionaldehyde, n-butylaldehyde, isobutylaldehyde, diethylacetoaldehyde, glyoxal and benzaldehyde; cyclic ketones such as cyclopentanone, trimethylcyclopentanone, cyclohexanone and trimethylcyclohexanone; fatty ketones such as acetone, methyl ethyl ketone, methyl propyl ketone, methyl isopropyl ketone, methyl isobutyl ketone, diethyl ketone, dipropyl ketone, diisopropyl ketone, dibutyl ketone and diisobutyl ketone; and β-dicarbonyl compounds such as acetylacetone, methyl acetoacetate, ethyl acetoacetate, dimethyl malonate, diethyl malonate, methyl ethyl malonate and dibenzoylmethane.

When an imino group is present in the ketimine compound, the imino group can be reacted with styrene oxide; glycidyl ethers such as butyl glycidyl ether and allyl glycidyl ether; and glycidyl esters. These ketimine compounds may be used each alone or in combinations of two or more thereof; these ketimine compounds are used within a range of 1 to 100 parts by weight in relation to 100 parts by weight of the (D) epoxy resin, and the used amount of the ketimine compounds is varied depending on the type of the epoxy resin and the type of the ketimine compound.

In the curable composition of the present invention, (E) an alkyl (meth)acrylate polymer may be contained. The "alkyl (meth)acrylate polymer" means a polymer which includes an alkyl methacrylate and/or an alkyl acrylate represented by the following general formula (6) as the main monomer component, and is a technical term meaning a polymer of a single monomer or a copolymer of two or more monomers:

$$CH_2=C(R^5)COOR^6 \quad (6)$$

where $R^5$ represents a hydrogen atom or a methyl group, and $R^6$ represents an alkyl group having 1 to 30 carbon atoms. By including this (E) alkyl (meth)acrylate polymer in the curable composition of the present invention, the adhesion and weather resistance of the composition are expected to be improved.

Examples of $R^6$ in the general formula (6) include a methyl group, an ethyl group, a propyl group, a n-butyl group, a tert-butyl group, a 2-ethylhexyl group, a nonyl group, a lauryl group, a tridecyl group, a cetyl group, a stearyl group and a behenyl group. It is to be noted that the monomers represented by the general formula (6) may be used each alone or admixtures of two or more thereof.

When the two or more monomers are used, simultaneous use of a monomer (a) in which $R^6$ in the general formula (6) has 1 to 8 carbon atoms and a monomer (b) in which $R^6$ in the general formula (6) has 10 or more carbon atoms preferably makes it easier to regulate the compatibility of the curable composition depending on the proportions of these used monomers.

Specific examples of the alkyl (meth)acrylatemonomers include methyl (meth)acrylate, ethyl (meth)acrylate, n-propyl(meth)acrylate, n-butyl(meth)acrylate, isobutyl (meth)acrylate, tert-butyl (meth)acrylate, n-hexyl (meth)acrylate, heptyl (meth)acrylate, 2-ethylhexyl (meth)acrylate, nonyl (meth)acrylate, decyl (meth)acrylate, undecyl (meth)acrylate, lauryl (meth)acrylate, tridecyl (meth)acrylate, myristyl (meth)acrylate, cetyl (meth)acrylate, stearyl (meth)acrylate, and behenyl (meth)acrylate.

The molecular chain of the (E) component is substantially formed of one or more types of alkyl (meth) acrylate monomer units; "substantially" as referred to here means that the proportion of the one or more types of alkyl (meth) acrylate monomer units in the (E) component exceeds 50 wt %, and is preferably 70 wt % or more. The (E) component may include, in addition to alkyl (meth) acrylate monomer units, such monomer units as copolymerizable with these monomer units. Examples of such copolymerizable monomer units include the carboxylic acid group-containing monomers such as (meth)acrylic acid; the amide group-containing monomers such as (meth)acrylamide and N-methylol(meth)acrylamide; the epoxy group-containing monomers such as glycidyl (meth)acrylate; and the amino group-containing monomers such as diethylaminoethyl(meth)acrylate and aminoethyl vinyl ether. These monomers can be expected to exhibit the copolymerization effect on the moisture curability and the inner-part curability. Additional examples of the monomers concerned also include the monomer units derived from acrylonitrile, styrene, α-methylstyrene, alkyl vinyl ethers, vinyl chloride, vinyl acetate, vinyl propionate and ethylene.

The (E) component polymer may include the reactive silicon group represented by the following general formula (1):

$$—Si(R^1_{3-a})X_a \quad (1)$$

where $R^1$ represents an alkyl group having 1 to 20 carbon atoms, an aryl group having 6 to 20 carbon atoms, an aralkyl group having 7 to 20 carbon atoms or a triorganosiloxy group represented by $(R'O)_3Si—$; when two $R^1$s are present, they may be the same or different; R' is a monovalent hydrocarbon group having 1 to 20 carbon atoms, and three R's may be the same or different; X represents a hydroxy group or a hydrolyzable group; when two or more Xs are present, they may be the same or different; and a represents 1, 2 or 3.

As an example of the method for introducing the reactive silicon groups into the (E) component polymer, a method can be cited in which a compound simultaneously having a polymerizable unsaturated bond and a reactive silicon is copolymerized with an alkyl (meth)acrylate monomer unit. Examples of the compound simultaneously having a polymerizable unsaturated bond and a reactive silicon group include the monomer represented by the general formula (7) and/or the general formula (8):

$$CH_2=C(R^5)COOR^7—Si(R^1_{3-a})X_a \quad (7)$$

where $R^5$ is the same as described above; $R^7$ represents a divalent alkylene group having 1 to 6 carbon atoms; $R^1$, X and a are the same as described above, $$CH_2=C(R^5)—Si(R^1_{3-a})X_a \quad (8)$$

where $R^5$, $R^1$, X and a are the same as described above.

As the monomer represented by the general formula (7) and/or the general formula (8), monomers well known in the art may be used; specific examples of such monomers include γ-methacryloxypropylpolyalkoxysilanes such as γ-methacryloxypropyltrimethoxysilane, γ-methacryloxypropylmethyldimethoxysilane, and γ-methacryloxypropyltriethoxysilane; γ-acryloxypropylpolyalkoxysilanes such as γ-acryloxypropyltrimethoxysilane, γ-acryloxypropylmethyldimethoxysilane, and γ-acryloxypropyltriethoxysilane; and vinylalkylpolyalkoxysilanes such as vinyltrimethoxysilane, vinylmethyldimethoxysilane, and vinyltriethoxysilane.

The (E) component can be obtained by means of a common vinyl polymerization method, such as a solution polymerization method based on radical reaction. The polymerization is usually carried out by reacting the above described monomer added with a radical initiator and a chain transfer agent at 50 to 150° C. In this case, the molecular weight distribution becomes wider than 1.8.

Examples of the above described radical initiators include azo initiators such as 2,2'-azobisisobutyronitrile, 2,2'-azobis(2-methylbutyronitrile), 4,4'-azobis(4-cyanovaleric)acid, 1,1'-azobis(1-cyclohexanecarbonitrile), azobisisobutyric acid amidine hydrochloride, 2,2'-azobis(2,4-dimethylvaleronitrile); and organic peroxide initiators such as benzoyl peroxide and di-tert-butyl peroxide. Azo initiators are preferably used because such initiators are not affected by the solvents used for polymerization and are low in degree of explosion hazard.

Examples of the chain transfer agent include mercaptans such as n-dodecylmercaptan, tert-dodecylmercaptan, laurylmercaptan, γ-mercaptopropyltrimethoxysilane, γ-mercaptopropylmethyldimethoxysilane, γ-mercaptopropyltriethoxysilane, and γ-mercaptopropylmethyldiethoxysilane; and halogen-containing compounds.

The polymerization may be carried out in a solvent. Examples of the solvent preferably include non-reactive solvents such as ethers, hydrocarbons and esters.

The (E) component having a number average molecular weight of 500 to 100,000 measured by GPC relative to polystyrene standard is preferable from the viewpoint of easy handlability. The (E) component having a number average molecular weight of 1,500 to 30,000 measured by GPC relative to polystyrene standard is more preferable because of satisfactory weather resistance and workability of the cured substance.

When the (E) component is used, the weight ratio between the used amounts of the (B) and (E) components is preferably such that (B)/(E)=(95/5) to (10/90), and more preferably (80/20) to (60/40).

The proportion of the used total amount of the (B) and (E) components in relation to the (A) component is preferably 10 to 500 parts by weight, more preferably 10 to 300 parts by weight, and particularly preferably 30 to 200 parts by weight, in relation to 100 parts by weight of the (A) component.

A tackifier resin (F) used in the present invention is not particularly limited and any known one can be used. Examples thereof include petroleum resins such as aliphatic petroleum resins (C-5 resins), aromatic petroleum resins (C-9 resins), aliphatic/aromatic mixed petroleum resins (C-5/C-9 resins), phenol-modified C-5/C-9 resins, and dicyclopentadiene petroleum resins; rosin ester resins such as ester compounds of rosin acid, disproportionated rosin acid, or hydrogenated rosin acid with glycerol or pentaerythritol; terpene resins such as terpene resin, hydrogenated terpene resins, aromatically modified terpene resins, aromatically modified hydrogenated terpene resins, phenol-modified terpene resins (terpene phenol resins), alkylphenol-modified terpene resins; styrene resins; xylene resins such as xylene resin, phenol-modified xylene resins, and alkylphenol-modified xylene resins; phenol resins such as novolac-type phenol resins, resol-type phenol resins, alkylphenol resins, rosin-modified phenol resins, cashew oil-modified phenol resins, and tall-oil modified phenol resins; and modified resins produced by modifying these resins with epoxy resins and acryl monomers. These may be used alone or in combination as a mixture of two or more of these resins if necessary. In particular, resins modified with phenol or alkylphenol are preferably used so that the compatibility and dispersion stability between the component (A) and the component (B) can be improved.

When the (F) component is used, the used amount thereof is 5 to 100 parts by weight, more preferably 5 to 30 parts by weight, and particularly preferably 5 to 20 parts by weight, in relation to 100 parts by weight of the (B) component. When the used amount of the (F) component is less than 5 parts by weight, the compatibility and the improvement effect of the dispersibility of the (A) and (B) components are insufficient as the case may be, while the used amount of the (F) component exceeds 100 parts by weight, the viscosity becomes high and the workability is degraded.

When the sum of the contents of the (A), (B), (C) and (F) components is represented as 100 parts by weight, more preferable is a case in which the contents of the (A), (B), (C) and (F) components are 30 to 60, 25 to 55, 15 to 50, and 2 to 30, respectively, from the viewpoints of the compatibility and the dispersibility of the (A) and (B) components.

The curable composition of the present invention may be blended with (G) a silane coupling agent according to the purpose. Specific examples of the silane coupling agent include isocyanate group-containing silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, and (isocyanatemethyl)dimethoxymethylsilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine; ketimine-type silanes such as N-(1,3-dimethylbutylidene)-3-(triethoxysilyl)-1-propaneamine; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane and mercaptomethyltriethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinyl-type unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; and isocyanurate silanes such as tris(trimethoxysilyl)isocyanurate. Additionally, condensates obtained by partial condensation of the above described silanes can also be used. Moreover, the following derivatives obtained by modifying these silanes can also be used as the silane coupling agents: amino-modified silyl polymer, silylated aminopolymer, unsaturated aminosilane complexes, phenylamino-long chain alkylsilane, aminosilylated silicone and silylated polyester.

From the viewpoint of the adhesion to porous materials such as mortar and concrete, silanes containing one or more amino groups per molecule are preferable.

When a silane coupling agent is used in the present invention, the silane coupling agent is used usually in a range from 0.1 to 20 parts by weight, and in particular, preferably in a range from 0.5 to 10 parts by weight, in relation to 100 parts by weight of the reactive silicon group-containing polymer (B).

The curable composition of the present invention is preferably regulated for use in such a way that a resulting cured substance has the following properties.

More specifically, it is preferable that the curable composition of the present invention is regulated so that the following cured substance may be obtained; namely, the cured substance obtained by curing the curable composition concerned by aging at 23° C. for 3 days and additional aging at 50° C. for 4 days, to form a 3 mm thick sheet-like specimen of the cured substance, and the specimen being subjected to a tensile test in conformity with JIS K 6251, and the tensile strength at break being 0.4 MPa or more and the elongation at break being 50% or more.

Such a regulation can be attained by the blending as described above. Additionally, such a regulation can also be attained by addition of the components described below according to need.

To the curable composition of the present invention, there may be added, according to need, a silanol condensation catalyst, a filler, a thixotropic agent, an antiaging agent, and other various additives.

No particular constraint is imposed on the silanol condensation catalyst; silanol condensation catalysts well known in the art may be used. Specific examples of the silanol condensation catalyst include esters of titanic acid such as tetrabutyl titanate and tetrapropyl titanate; organotin compounds such as dibutyltin dilaurate, dibutyltin maleate, dibutyltin diacetate, tin octylate, tin naphthenate, a reaction product between dibutyltin oxide and a phthalate, and dibutyltin bis(acetylacetonate); organoaluminum compounds such as aluminum tris (acetylacetonate), aluminum tris(ethylacetoacetate), and diisopropoxyaluminum ethylacetoacetate; chelate compounds such as zirconium tetraacetylacetonate and titanium tetraacetylacetonate; lead octylate; amine compounds such as butylamine, octylamine, dibutylamine, laurylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-methylimidazole, and 1,8-diazabicyclo[5,4,0]undecene-7; salts between these amine compounds and carboxylic acids and the like; acid phosphates; reaction products between acid phosphates and amines; saturated or unsaturated polycarboxylic acids or acid anhydrides thereof; low molecular weight polyamide resins obtained from excessive polyamines and polybasic acids; reaction products between excessive polyamines and epoxy compounds; amino group-containing silane coupling agents such as γ-aminopropyltrimethoxysilane and N-(β-aminoethyl)-γ-aminopropylmethyldimethoxysilane. Specific examples concerned also include silanol condensation catalysts well known in the art such as other acidic catalysts and basic catalysts. These catalysts may be used each alone or in combinations of two or more thereof.

The silanol condensation catalyst is preferably used within a range from 0.01 to 15 parts by weight, and particularly preferably from 0.1 to 10 parts by weight in relation to 100 parts by weight of the (B) component (when the (E) component is also added, in relation to 100 parts by weight of the sum amount of the (B) and the (E) components). Unpreferably, when the used amount concerned is less than 0.01 part by weight, the curability of the composition is degraded, while the used amount exceeds 15 parts by weight, the storage stability and adhesion are degraded. From the viewpoints of the curing rate and storage stability, tetravalent tin catalysts are preferable.

As for the filler, no particular constraint is imposed thereon; fillers well known in the art may be used. Specific examples of the fillers include inorganic fillers such as calcium carbonate, magnesium carbonate, titanium oxide, fly ash, silica sand, crushed stone, gravel, carbon black, fused silica, precipitated silica, diatom earth, white clay, kaolin, clay, talc, wood flour, walnut shell powder, chaff powder, silicic acid anhydride, quartz powder, aluminum powder, zinc powder, asbestos, glass fiber, carbon fiber, glass bead, alumina, glass balloon, fly ash balloon, shirasu balloon, silica balloon, and silicon oxide; woody fillers such as pulp and cotton chip; and organic fillers such as fine powders of powdered rubber, regenerated rubber, and thermoplastic or thermosetting resins, and balloons made of polystyrene. These fillers may be used each alone or in combinations of two or more thereof.

The filler is used preferably in a range from 50 to 1000 parts by weight, and particularly preferably in a range from 60 to 900 parts by weight, in relation to 100 parts by weight of the (B) component. When the used amount of the filler is less than 50 parts by weight, there is a fear that the purpose of using the filler is not attained. On the other hand, when the used amount of the filler exceeds 1000 parts by weight, there is a fear that the viscosity is increased and the workability is degraded. As the filler, particularly, fly ash balloon and calcium carbonate are more preferable.

As for the thixotropic agent, no particular constraint is imposed thereon, and thixotropic agents well known in the art may be used. Specific examples of the thixotropic agent include hydrogenated castor oil, organic amide wax, organic bentonite and calcium stearate. These thixotropic agents may be used each alone or in combinations of two or more thereof.

The thixotropic agent is used preferably in a range from 0.1 to 50 parts by weight, and particularly preferably in a range from 1 to 30 parts by weight, in relation to 100 parts by weight of the (B) component. Unpreferably, when the used amount of the thixotropic agent is less than 0.1 part by weight, sometimes sufficient thixotropy cannot be attained, while when the used amount of the thixotropic agent exceeds 50 parts by weight, the cost is increased.

As for the antiaging agent, no particular constraint is imposed thereon, and antiaging agents well known in the art may be used. Specific examples of the antiaging agent include a phenol antioxidant, an aromatic amine antioxidant, a sulfur-based antioxidant, a phosphorus-based antioxidant, a benzotriazole ultraviolet absorber, a salicylate ultraviolet absorber, a benzoate ultraviolet absorber, a benzophenone ultraviolet absorber, a hindered amine light stabilizer and a nickel-based light stabilizer.

The antiaging agent is used preferably in a range from 0.01 to 20 parts by weight, and particularly preferably 0.1 to 10 parts by weight, in relation to 100 parts by weight of the (B) component.

Examples of the phenol antioxidant may include 2,6-di-tert-butylphenol, 2,4-di-tert-butylphenol, 2,6-di-tert-butyl-4- methylphenol, 2,5-di-tert-butylhydroquinone, n-octadecyl-3-(3,5-di-tert-butyl-4-hydroxyphenyl)propionate, pentaerythrityl-tetrakis[3-(3,5-di-tert-butyl-4-hydroxyphenyl)propionate], 2,2'-methylenebis(4-methyl-6-tert-butylphenol), 4,4'-butylidenebis(3-methyl-6-tert-butylphenol), and 4,4'-thiobis(3-methyl-6-tert-butylphenol).

Examples of the aromatic amine antioxidant may include N,N'-diphenyl-p-phenylenediamine and 6-ethoxy-2,2,4-trimethyl-1,2-dihydroquinoline.

Examples of the sulfur-based antioxidant may include dilauryl-3,3'-thiodipropionate, ditridecyl-3,3'-thiodipropionate and distearyl-3,3'-thiodipropionate. Examples of the phosphorus-based antioxidant may include diphenylisooctylphosphite and triphenylphosphite.

Examples of the benzotriazole ultraviolet absorber may include 2-(3,5-di-tert-butyl-2-hydroxyphenyl)-5-chlorobenzotriazole, 2-(3-tert-butyl-5-methyl-2-hydroxyphenyl)-5-chlorobenzotriazole, 2-(3,5-di-tert-butyl-2-hydroxyphenyl) benzotriazole, and 2-(5-methyl-2-hydroxyphenyl) benzotriazole.

Examples of the salycylate ultraviolet absorber may include 4-tert-butylphenyl salicylate.

Examples of the benzoate ultraviolet absorber may include 2,4-di-tert-butylphenyl-3,5-di-tert-butyl-4-hydroxybenzoate.

Examples of the benzophenone ultraviolet absorber may include 2,4-dihydroxybenzophenone, 2-hydroxy-4-methoxybenzophenone, 2-hydroxy-4-n-octoxybenzophenone, 2-hydroxy-4-n-dodecyloxybenzophenone and 2-hydroxy-4-benzyloxybenzophenone.

Examples of the hindered amine light stabilizer may include bis(2,2,6,6-tetramethyl-4-piperidyl)sebacate, bis(1,2,2,6,6-pentamethyl-4-piperidyl)sebacate, 1-{2-[3-(3,5-di-tert-butyl-4-hydroxyphenyl)propionyloxy]ethyl}-4-[3-(3,5-di-tert-butyl-4-hydroxyphenyl)propionyloxy]-2,2,6,6-tetramethylpiperidine, and 4-benzoyloxy-2,2,6,6-tetramethylpiperidine.

Examples of the nickel-based light stabilizer may include nickel dibutyldithiocarbamate, [2,2'-thiobis(4-tert-octylphenolate)]-2-ethylhexylamine nickel (II) and [2,2'-thiobis(4-tert-octylphenolate)]-n-butylamine nickel (II).

The antiaging agents may be used each alone or in combinations of two or more thereof. Some combinations of the antiaging agents may effectively function as compared with single use thereof.

The curable composition of the present invention may be used as a sealant, an adhesive, a tackifier, an injection material, a waterproof material, a damping material, a soundproof material and the like in wide fields including applications to civil engineering, construction and industry.

Specific examples of the application may include joint sealants for interior/exterior wall, floor, various concretes, and metals; sealants for ships; joint sealants for pools; sealants for repelling ants; adhesives for floor materials, wall materials, roof materials and sheet waterproof materials; adhesives for tiles, stone materials, ornamental panels and the like for interior/exterior wall; sealing adhesives for earthen pipes, manholes, cables and the like; potting materials; various tackifiers; pavement materials, repairing materials and joint materials for ordinary road, expressway, and airport runway; repairing materials; waterproof materials for building basements and multilevel parking structure; waterproof material for roof; waterproof materials for floor; coating materials for roof; and damping materials, soundproof materials, mold form materials and antirust materials for vehicles, ships and home electric appliances. These materials may also be used as one-component curable compositions. Among the above described applications, the curable composition of the present invention is particularly suitable for applications to adhesives for tile, waterproof materials, road pavement materials, sealants and damping materials. Now, description will be made below on the applications to waterproof materials, adhesives for tile, road pavement materials, sealants and damping materials.

<Waterproof Material>

A mainstream method of waterproofing work is a so-called heat method of asphalt waterproofing construction in which blown asphalt is melted at the working site and asphalt roofing is glued therewith, and this operation is repeated three to four times to form the waterproof layer. Examples of other methods include a torch method in which asphalt roofing sheet is fixed to the base material while the backside of asphalt roofing sheet is being heated with a special torch burner to melt the backside; an ambient-temperature (adhesion) method in which the adhesive provided on the backside of the asphalt roofing sheet makes the sheet be fixed on the base material; and an adhesion construction method in which asphalt roofing sheet is adhered to the base material with an asphalt based adhesive. Nevertheless, the heat method of asphalt waterproofing construction has hitherto been the mainstream method because of the waterproof reliability (adhesion to the base material) thereof. The heat method of asphalt waterproofing construction is avoided in residential areas and city center because this method has such a drawback that when asphalt is melted, smoke and odor are heavily generated from the melted asphalt to seriously pollute the environment surrounding the site concerned. Accordingly, the areas in which this method can be adopted are limited. Additionally, this method involves the danger of burning workmen, so that workmen tend to avoid this method.

For the purpose of overcoming these problems, before applying asphalt roofing sheet, cut-back asphalt prepared by diluting asphalt with a solvent is applied as a primer to improve the adhesion to the base material; however, the solvent volatilizes to pollute the environment seriously.

With respect to such a problem, the waterproof material including the curable composition of the present invention is effective as a waterproof material, an adhesive for asphalt roofing sheet and a primer because when working with the composition concerned, neither smoke and odor of asphalt nor solvent odor are generated, and the composition concerned exhibits sufficient room-temperature curability and satisfactory water resistant adhesion to mortar.

<Adhesive for Tile>

Adhesives for tile are used for covering with tiles building wall, bath wall, lavatory wall, and wall of kitchen and associated area. Specific examples of adherends in such cases include inorganic basic board such as cement mortar board, calcium silicate board, cement board, ALC board and ceramic siding board; woody base material such as plywood; and ceramic, porcelain and stone tiles.

As for covering with tiles, dumpling adhering construction methods using cement mortar kneaded to form dumplings have hitherto been mainstream construction methods; however, nowadays, increased are cases in which organic adhesives are used. With respect to reactive adhesives for tile, urethane resin adhesives or epoxy resin adhesives are used as representative adhesives for tile; as for urethane adhesives, the hazard and the adverse effects on human body of the isocyanates and organic solvents in the adhesives are viewed as problematic, while as for epoxy adhesives, rash caused by the amine curing agents and their hazard and adverse effects on human body are viewed as problematic.

Moreover, epoxy resin adhesives cannot absorb the strain caused by external force exerted thereto, and accordingly, exfoliation of tiles due to vibration caused by earthquake and the like provokes problems. It has been reported that for the purpose of solving these problems, by blending a rubbery organic polymer and a modified silicone compound, the brittleness of an epoxy resin cured substance is improved to yield a flexible cured substance (Japanese Patent Laid-Open No. 6-101319); however, in such places where ornamental material pieces such as tiles and stone material pieces get wet frequently, sometimes these pieces are exfoliated and the water resistant adhesion of such a cured substance is not necessarily sufficient.

As a countermeasure against such a problem, an adhesive for tile including the curable composition of the present invention exhibits excellent water resistant adhesion, in particular, alkaline water resistant adhesion, and can be used without solvent, so that the adhesive concerned is free from such apprehension as involving odor, inflammability and adverse effects on human body.

<Road Pavement Materials>

When asphalt is used as road pavement material, generally the heated asphalt pavement has hitherto been used; however, this method has a drawback that smoke and odor are heavily generated from heated asphalt to pollute the surrounding environment seriously. Additionally, the heated asphalt pavement leads to insufficient stretchability and adhesive force, and to fluidization of the pavement surface with temperature increase in summer to cause the problems involving cracking and stickiness. Moreover, in winter, the degradation of the aggregate bonding force in the asphalt pavement material causes degradation of the surface layer of the asphalt pavement, and the temperature variation causes cracking and stripping of the surface layer concerned.

As a countermeasure against such problems, the road pavement material including the curable composition of the present invention makes it possible to carry out pavement and repair without generating smoke and odor when paving.

When the curable composition of the present invention is used as road pavement material, it is preferable to blend aggregate for the purpose of increasing the reinforcement.

Examples of the aggregate include coarse aggregate, fine aggregate and filler. As coarse aggregate, crushed stone is used, and additionally, crushed gravel, gravel and slug may also be used. As fine aggregate, river sand, beach sand, pit sand and the like are used, and additionally, iron sand screenings and crushed stone screenings may also be used. Additionally, light color aggregate and hard aggregate may also be used. As filler, stone dust obtained by pulverizing the limestone and igneous stones; additionally, rock powder, calcium carbonate powder, lime, plaster, fly ash, fly ash balloon, cement, incinerated ash and the like may also be used. Additionally, carbon black, pigments and the like may also be used. Moreover, as a part of the filler, there may also be used staples such as asbestos, glass fiber, rock wool, synthetic fiber and carbon fiber, and mica powder.

<Sealant>

In the fields of civil engineering, construction, ship building, vehicle production and the like, various sealants have been used to fill and seal joints and cracks for the purpose of attaining water tightness and air tightness; in particular, sealants using reactive silicon group-containing organic polymers are generally widely used from the viewpoints of weather resistance, curability and workability (for example, Japanese Patent Laid-Open No. 8-003537). However, the organic polymer used for such a sealant is insufficient in the water resistance thereof, which causes a problem that when the sealant is soaked in water for a long time, moisture permeation and degradation of the adhesion interfacial force occur, and neither sufficient water blocking property nor sufficient adhesion can be attained. Additionally, such a sealant has insufficient weather resistance, which causes a problem that when weathered outside for a long time, cracks are generated on the surface and in the interior thereof to prevent ensuring sufficient water blocking property and sufficient adhesion.

As a countermeasure against such a problem, the sealant including the curable composition of the present invention is excellent in weather resistance, water resistance and adhesion.

<Damping Material>

Damping materials are used for vehicles, buildings, home electric appliances and the like.

Damping material is adhered directly or indirectly to a vibration generating source to contribute to soundproofing by controlling the vibration. For example, damping materials are used for steel plate portions in a dash panel separating the engine compartment and the passenger compartment, floor and a trunk compartment in a vehicle, building portions such as the floor of a condominium, and home electric appliances generating noises such as air conditioners, compressors and vacuum cleaners.

However, when the floor of a vehicle is covered with asphalt as a damping sheet, asphalt is needed to be melted by heating, and accordingly there has been a problem involving thermal hydraulic property, namely, a problem that the thickness of the sheet can hardly be made uniform. Consequently, the damping effect becomes nonuniform, and the acclimation of the sheet to the irregularities of the base material becomes poor to cause a technical problem that thermal fusion bonding with the base material can hardly be attained in a uniform close contact with the base material. Among methods for overcoming these problems is a method in which a fibrous filler is mixed in the sheet base material (for example, Japanese Patent Laid-Open No. 7-323791). However, in view of conducting thermal fusion bonding of asphalt, the above described physical properties are not satisfied. Additionally, a room-temperature curing type is eagerly demanded for the purpose of making the working process efficient and improving the close adhesion to irregular portions. As a countermeasure against such a problem, a damping material including the curable composition of the present invention is satisfactory in workability, does not exhibit swelling and is excellent in adhesion to the irregular portions when applied to construction.

EXAMPLES

For the purpose of more clearly presenting the present invention, description will be made below with reference to specific examples, but the present invention is not limited to these examples.

Synthesis Example 1

By use of a polyoxypropylene diol having a number average molecular weight of 2,000 as an initiator and zinc hexacyanocobaltate-glyme complex catalyst, polymerization of propylene oxide was carried out to yield a polyoxypropylene glycol having a number average molecular weight of 30,000 (a molecular weight relative to polystyrene standard measured by GPC). The obtained polyoxypropylene glycol was reacted with sodium methoxide, and then with allyl chloride to convert the terminal hydroxy groups into unsaturated groups. With the unsaturated group-terminated polyoxyalkylene, 0.82 mole of dimethoxymethylsilane, in relation to 1 mole of the unsaturated group of the unsaturated group-terminated polyoxyalkylene, was reacted in the presence of chloroplatinic acid, to yield a polyoxypropylene polymer (polymer A) having dimethoxymethylsilyl groups at the molecular terminals with a proportion of 80% (based on $^1$H-NMR analysis) and having a number average molecular weight of 30,200.

Synthesis Example 2

By use of a polyoxypropylene diol having a number average molecular weight of 2,000 as an initiator and zinc hexacyanocobaltate-glyme complex catalyst, polymerization of propylene oxide was carried out to yield a polyoxypropylene glycol having a number average molecular weight of 26,000 (a molecular weight relative to polystyrene standard measured by GPC). The obtained polyoxypropylene glycol was reacted with sodium methoxide, and then with allyl chloride to convert the terminal hydroxy groups into unsaturated groups. With the unsaturated group-terminated polyoxyalkylene polymer, 0.77 mole of a hydrosilane compound represented by HSi(CH$_3$)(CH$_3$)Osi(CH$_3$)(CH$_3$)CH$_2$CH$_2$Si(OCH$_3$)$_3$, in relation to 1 mole of the unsaturated group of the unsaturated group-terminated polyoxyalkylene polymer, was reacted in the presence of chloroplatinic acid, to yield a polyoxypropylene polymer (polymer B) having trimethoxysilyl groups at the molecular terminals with a proportion of 75% (based on $^1$H-NMR analysis) and having a number average molecular weight of 26,300.

Synthesis Example 3

By use of a polypropylene glycol having a number average molecular weight of 2,000 as an initiator and zinc hexacyanocobaltate-glyme complex catalyst, polymerization of propylene oxide was carried out to yield a polyoxypropylene glycol having a number average molecular weight of 15,000 (a molecular weight relative to polystyrene standard measured by GPC). The obtained polyoxypropylene glycol was reacted with sodium methoxide, and then the terminal hydroxy groups were converted into methallyl groups by adding 3-chloro-2-methyl-1-propene. With the methallyl group-terminated polyoxyalkylene polymer, 1.2 moles of dimethoxymethylsilane, in relation to 1 mole of the methallyl group of the methallyl group-terminated polyoxyalkylene polymer, was reacted in the presence of an antioxidant 2,6-di-tert-butyl-p-cresol, chloroplatinic acid and sulfur (1 eq/Pt), to yield a polyoxypropylene polymer (polymer C) having dimethoxymethylsilyl groups at the molecular terminals with a proportion of 97% (based on $^1$H-NMR analysis) and having a number average molecular weight of 15,300.

Synthesis Example 4

By use of a polyoxypropylene diol having a number average molecular weight of 2,000 as an initiator and zinc hexacyanocobaltate-glyme complex catalyst, polymerization of propylene oxide was carried out to yield a polyoxypropylene glycol having a number average molecular weight of 16,000 (a molecular weight relative to polystyrene standard measured by GPC). The obtained polyoxypropylene glycol was reacted with sodium methoxide, and then with allyl chloride to convert the terminal hydroxy groups into unsaturated groups. With the unsaturated group-terminated polyoxyalkylene, 0.65 mole of dimethoxymethylsilane, in relation to 1 mole of the unsaturated group of the unsaturated group-terminated polyoxyalkylene, was reacted in the presence of chloroplatinic acid, to yield a polyoxypropylene polymer (polymer D) having dimethoxymethylsilyl groups at the molecular terminals with a proportion of 65% (based on $^1$H-NMR analysis) and having a number average molecular weight of 16,200.

Synthesis Example 5

By use of a polyoxypropylene diol having a number average molecular weight of 3,000 was reacted with sodium methoxide, and then with allyl chloride to convert the terminal hydroxy groups into unsaturated groups. With the unsaturated group-terminated polyoxyalkylene, 0.77 mole of dimethoxymethylsilane, in relation to 1 mole of the unsaturated group of the unsaturated group-terminated polyoxyalkylene, was reacted in the presence of chloroplatinic acid, to yield a polyoxypropylene polymer (polymer E) having dimethoxymethylsilyl groups at the molecular terminals with a proportion of 75% (based on $^1$H-NMR analysis) and having a number average molecular weight of 5,200 (a molecular weight relative to polystyrene standard measured by GPC).

Synthesis Example 6

In a pressure-resistant reaction vessel equipped with a stirrer, 800 g of a polyoxypropylene glycol having a number average molecular weight of 5,200 and 50.2 g of isophorone diisocyanate were placed, and mixed together, and then 0.8 g of a tin catalyst (a 10% DOP solution of dibutyltin dilaurate) was added to the mixture thus obtained. Stirring of the mixture at 80° C. for 4 hours yielded an isocyanate group-terminated polymer having a molecular weight of about 15,000 (a molecular weight derived from the titrimetric value (0.579%) for the isocyanate group) The reaction mixture was cooled down to 60° C., then added with 1.0 [eq/NCO group] of γ-aminopropyltrimethoxysilane, and the mixture was stirred for about 30 minutes to yield a polyoxypropylene polymer (polymer F) having trimethoxysilyl groups at the molecular terminals thereof and having a number average molecular weight of 17,000 (a molecular weight relative to polystyrene standard measured by GPC).

Synthesis Example 7

By use of a polyoxypropylene diol having a number average molecular weight of 2,000 as an initiator and zinc hexacyanocobaltate-glyme complex catalyst, polymerization of propylene oxide was carried out to yield a polyoxypropylene glycol having a number average molecular weight of 25,500 (a molecular weight relative to polystyrene standard measured by GPC). To 100 parts by weight of the obtained polyoxypropylene glycol, 1.8 parts by weight of γ-isocyanatepropyltrimethoxysilane was added, and the mixture thus obtained was allowed to react at 90° C. for 5 hours to yield a trimethoxysilyl-terminated polyoxypropylene polymer (polymer G).

Synthesis Example 8

By use of a 1/1 (weight ratio) mixture composed of a polyoxypropylene diol having a number average molecular weight of 2,000 and a polyoxypropylene triol having a number average molecular weight of 3,000 as an initiator and zinc hexacyanocobaltate-glyme complex catalyst, polymerization of propylene oxide was carried out to yield a polypropylene oxide having a number average molecular weight of 19,800 (a molecular weight relative to polystyrene standard measured by GPC). The obtained polypropylene oxide was reacted with sodium methoxide, and then with allyl chloride to convert the terminal hydroxy groups into unsaturated groups. With the unsaturated group-terminated polyoxyalkylene, 0.72 mole of dimethoxymethylsilane, in relation to 1 mole of the unsaturated group of the unsaturated group-terminated polyoxyalkylene, was reacted in the presence of chloroplatinic acid, to yield a polyoxypropylene polymer (polymer I) having dimethoxymethylsilyl groups at the molecular terminals with a proportion of 70% (based on $^1$H-NMR analysis) and having a number average molecular weight of 20,000.

Synthesis Example 9

Into 43 g of toluene heated to 110° C., a solution was dropped over a period of 4 hours which was prepared by dissolving 2.6 g of azobisisobutyronitrile as a polymerization initiator in a mixture composed of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of toluene. Then, the reaction mixture thus obtained was allowed to polymerize for 2 hours, to yield a copolymer (polymer H) having a solid content of 60% and a number average molecular weight of 2,200 based on GPC (relative to polystyrene standard).

Each of polymers A to E and I obtained in Synthesis Examples 1 to 5 and 8, respectively, was blended with polymer H obtained in Synthesis Example 9 in the solid content ratio (weight ratio) of 70/30, and the blended mixture thus obtained was devolatilized by heating it in an evaporator at 110° C. and under a reduced pressure to yield a transparent and viscous liquid having a solid content of 99% or more.

The various materials used in Examples are listed below.

(A) Components
Straight asphalt 1: Straight Asphalt 150-200 (manufactured by Cosmo Oil Co., Ltd.), 9.1 parts by weight of asphaltene concentration (measured according to JPI-5S-22-83 method)
Straight asphalt 2: PLANTA-2 (180-200) (manufactured by PDVSA Ltd.), 13.9 parts by weight of asphaltene concentration (measured according to JPI-5S-22-83 method)
Blown asphalt: Blown Asphalt 20-30 (manufactured by Cosmo Oil Co., Ltd.)
Cut-back asphalt: Obtained by diluting blown asphalt 20-30 with toluene (solid content: 60%)
Coal tar; Manufactured by Cosmo Oil Co., Ltd.

(B) Components
Polymer A, Polymer B, Polymer C, Polymer D and Polymer E obtained in above Synthesis Examples (C) Components
DIDP: Diisodecylphthalate (manufactured by New Japan Chemical Co., Ltd.)
Mesamoll II: Phenyl alkylsulfonate (manufactured by Bayer Ltd.)
HB-40: partially hydrogenated terphenyl (manufactured by Solutia Inc.)
Topcizer No. 3: N-ethyl-o/p-toluenesulfonamide (manufactured by Fuji Amide Chemical Co., Ltd.)

(D) Component
Epicoat 828: Epoxy resin (manufactured by Japan Epoxy Resin Co., Ltd.)

(E) Component
Polymer F obtained in one of above Synthesis Examples (F) Components
PM-100: Phenol-modified C-5/C-9 petroleum resin (manufactured by Toho Chemical Industry Co., Ltd.)
FTR-8100: C-9 petroleum resin (manufactured by Mitsui Petroleum Chemical, Co., Ltd.)
HP-70: Alkylphenol-modified xylene resin (manufactured by Fudow Corporation)
YS Polyster T-30: Phenol-modified terpene resin (manufactured by Yasuhara Chemical Co., Ltd.)
Mightyace G-125: Phenol-modified terpene resin (manufactured by Yasuhara Chemical Co., Ltd.)

(Block Copolymer)
SBS: Styrene/butadiene/styrene block copolymer (Rubber Component)
SBR: Styrene/butadiene rubber (Silane Coupling Agents)
A-1310: γ-Isocyanatepropyltriethoxysilane (manufactured by Dow Corning Toray Silicone Co., Ltd.)
A-171: Vinyltrimethoxysilane (manufactured by Dow Corning Toray Silicone Co., Ltd.)
A-187: γ-Glycidoxypropyltrimethoxysilane (manufactured by Dow Corning Toray Silicone Co., Ltd.)
A-1120: N-(β-Aminoethyl)-γ-aminopropyltrimethoxysilane (manufactured by Dow Corning Toray Silicone Co., Ltd.)

(Fillers)
Calcium carbonate: Manufactured by Shiraishi Calcium Kaisha, Ltd.
Fly ash balloon: Microballoon (alumina silicate manufactured by Tokai Kogyo Co., Ltd.)
Sepiolite S: Magnesium silicate (manufactured by Nippon Talc Co., Ltd.)
Silica sand: Manufactured by Maruo Calcium Co., Ltd.
Talc: Microace P4 (Average particle size: 4.5 μm, manufactured by Nippon Talc Co., Ltd.)
Aggregates (Curing Catalysts)
U-220: Organotin compound (manufactured by Nitto Kasei Co., Ltd.)
SCAT-1: Organotin compound (manufactured by Sankyo Organic Chemicals Co., Ltd.)
SCAT-27: Organotin compound (manufactured by Sankyo Organic Chemicals Co., Ltd.)

(Epoxy Resin Curing Agents)
H-30: Ketimine curing agent (manufactured by Japan Epoxy Resin Co., Ltd.)
TAP: 2,4,6-Tris(dimethylaminomethyl)phenol (manufactured by Kayakuakuzo Co., Ltd.)

(Antioxidant)
IRGANOX 245: Hindered phenol antioxidant (manufactured by Ciba Specialty Chemicals Ltd.)

(Ultraviolet Absorber)
TINUVIN 213: Benzotriazole ultraviolet absorber (manufactured by Ciba Specialty Chemicals Ltd.)

(Light Stabilizer)
SANOL LS765: Hindered amine light stabilizer (manufactured by Sankyo Co., Ltd.)

(Evaluation of Physical Properties)

Evaluation was carried out on the following items.

<Odor>

A judgment was made as to whether solvent odor, and smoke and odor of asphalt are generated or not when a composition was applied. A case where neither odor nor smoke was generated was judged as good, while a case where either smoke or odor was generated was judged as poor.

<Curability>

A composition was applied and then the surface of the composition was touched with a spatula. The time elapsed until the composition no longer stuck to the spatula was measured, under the conditions of 23° C. and 50% R.H. A case where the surface of the composition was cured within 30 minutes was judged as good, while a case where this was not the case was judged as poor.

<Storage Stability>

A curable composition was hermetically stored at 5° C., 23° C. and 50° C. for 30 days, and the segregation condition was visually evaluated. A case where no segregation was observed in 30 days was graded as "A." A case where no segregation was observed in 20 days was graded as "B." A case where segregation was observed within 10 days was graded as "C."

<Tensile Properties of a Cured Substance>

A composition was made to be an about 3 mm thick sheet, and the sheet was aged at 23° C. for 3 days and additionally at 50° C. for 4 days to be cured. Then the sheet was blanked into a dumbbell-shaped specimen of the type No. 3 in conformity with JIS K 6251. By use of an apparatus, Autograph, manufactured by Shimadzu Corp., a tensile test was carried out at a tensile rate of 200 mm/min (23° C., 50% R.H.) to measure the tensile strength at break (Tb) and the elongation at break (Eb). The Tb values of 1.0 MPa or more, from 0.4 to 1.0 MPa, and 0.4 MPa or less were graded as "A," "B" and "C," respectively. The Eb values of 100% or more, from 50 to 100%, and 50% or less were graded as "A," "B" and "C," respectively.

<Adhesion>

A composition was applied in beads on a mortar base material, and aged at 23° C. and 50% R.H. for 7 days. Then, a cut was made between the cured substance and the mortar, and the cured substance was peeled off to observe the adhesion condition. Cases where the adhesive was completely stayed on the mortar base material, nearly half of the adhesive stayed on the mortar base material, and absolutely no adhesive stayed on the mortar base material were graded as "A," "B" and "C," respectively.

Mortar: 50×50×15 mm, manufactured by Engineering Test Service.

<Water Resistant Adhesion>

A specimen prepared and aged according to the above described procedures was soaked in water at 23° C. for 7 days. Immediately after taking out the specimen from the water, a cut was made between the cured substance and the mortar, and the cured substance was peeled off to observe adhesion condition. Cases where the adhesive stayed on the mortar base material, part of the adhesive stayed on the mortar base material, and no adhesive stayed on the mortar base material were graded as "A," "B" and "C," respectively.

Mortar: 50×50×15 mm, manufactured by Engineering Test Service.

<Weather Resistance Test>

A curable composition was filled in to form a 3 mm thick sheet, allowed to stand at 23° C. for 3 days, and then heated at 50° C. for 4 days to yield a rubbery sheet. The rubbery sheet was placed on a 1 mm thick aluminum plate and placed in a sunshine weatherometer (manufactured by Suga Test Instruments Co., Ltd.) to evaluate the weather resistance of the sheet. A case where no degradation was observed in 1500 hours of sunshine was graded as "A," a case where no degradation was observed in 1000 hours of sunshine is graded as "B," and a case where degradation was observed within 1000 hours of sunshine was graded as "C."

<Workability>

The viscosity of a composition was measured with a BH type viscometer (rotor: No. 7, speed of rotation: 10 rpm, temperature: 23° C.). A case where the viscosity was 500 Pa·s or less was graded as good, and a case where the viscosity was 500 Pa·s or above was graded as poor.

<Tile Adhesion Test>

An adhesive was applied onto a 70×70×20 mm mortar plate, and the adhesive was made uniform with a comb trowel; then a 45×45×7 mm porcelain tile was adhered onto the mortar plate, and aged for 7 days (23° C., 50% R.H.). A tensile jig was fixed to the surface of the specimen tile with an epoxy adhesive, and the subjected to a tensile test with an autograph (tensile rate: 5 mm/min). Additionally, the two specimens prepared as described above were soaked respectively in warm water at 60° C., and in a saturated aqueous solution of calcium hydroxide at 60° C. for 7 days; then, the specimens each were taken out from the water or the solution, and immediately subjected to a tensile test to evaluate the water-resistant adhesion strength. It is to be noted that the ratios of the adhesion strength after soaking in warm water at 60° C. and the adhesion strength after soaking in the saturated aqueous solution of calcium hydroxide at 60° C. to the adhesion strength under normal conditions were derived as water-resistant retention ratio and alkali-resistant retention ratio, respectively.

Examples 1 to 13, Comparative Examples 1 to 3

According to the compositions shown in Table 1, various blending materials were kneaded with a 5 L mixer to prepare the curable compositions of Examples 1 to 13 and Comparative Examples 1 to 3.

The evaluation results obtained are shown in Table 1.

TABLE 1

| | | Example 1 | Example 2 | Example 3 | Example 4 | Example 5 | Example 6 | Example 7 | Example 8 |
|---|---|---|---|---|---|---|---|---|---|
| (A) Components | Straight asphalt 1 | 70 | 70 | 70 | 50 | 70 | 70 | 70 | 70 |
| | Straight asphalt 2 | | | | | | | | |
| | Blown asphalt | | | | | | | | |
| | Cut-back asphalt | | | | | | | | |
| | Coal tar | | | | | | | | |

TABLE 1-continued

|  |  |  |  |  |  |  |  |  |  |
|---|---|---|---|---|---|---|---|---|---|
| (B) Components | Polymer A | 50 |  |  | 20 | 20 |  |  |  |
|  | Polymer B |  | 50 |  | 30 |  |  |  |  |
|  | Polymer C |  |  | 50 |  | 30 |  |  |  |
|  | Polymer D |  |  |  |  |  | 50 |  |  |
|  | Polymer E |  |  |  |  |  |  | 50 |  |
|  | Polymer I |  |  |  |  |  |  |  | 50 |
| (C) Components | DIDP | 30 | 10 | 20 | 30 | 40 | 20 | 20 | 20 |
|  | HB-40 | 30 | 30 | 30 | 30 | 20 | 30 | 30 | 30 |
| (F) Components | PM-100 | 5 | 5 | 5 | 5 | 5 | 5 | 5 | 5 |
|  | HP-70 |  |  |  |  |  |  |  |  |
|  | T-30 |  |  |  |  |  |  |  |  |
|  | G125 |  |  |  |  |  |  |  |  |
| (G) Components | A-171 | 1 | 1 | 1 | 1 | 1 | 1 | 1 | 1 |
|  | A-1120 | 2 | 2 | 2 | 2 | 2 | 2 | 2 | 2 |
| Block copolymer | SBS |  |  |  |  |  |  |  |  |
| Filler | Calcium carbonate | 200 | 200 | 200 | 200 | 200 | 200 | 200 | 200 |
| Curing catalyst | U220 | 1 | 1 | 1 | 1 | 1 | 1 | 1 | 1 |
| Tensile properties | Tensile strength at break (MPa) | A | A | A | A | A | A | B | A |
|  | Elongation at break (%) | A | A | A | A | A | A | B | A |
| Workability |  | Good | Good | Good | Good | Good | Good | Good | Good |
| Odor |  | Good | Good | Good | Good | Good | Good | Good | Good |
| Curability |  | Good | Good | Good | Good | Good | Good | Good | Good |
| Storage stability | Storage at 23° C. | A | A | A | A | A | A | A | A |
| Adhesion |  | A | A | A | A | A | A | B | A |

|  |  | Example 9 | Example 10 | Example 11 | Example 12 | Example 13 | Comp. ex. 1 | Comp. ex. 2 | Comp. ex. 3 |
|---|---|---|---|---|---|---|---|---|---|
| (A) Components | Straight asphalt 1 |  | 100 | 70 | 70 | 70 |  |  |  |
|  | Straight asphalt 2 | 70 |  |  |  |  |  |  |  |
|  | Blown asphalt |  |  |  |  |  | 100 |  |  |
|  | Cut-back asphalt |  |  |  |  |  |  | 170 |  |
|  | Coal tar |  |  |  |  |  |  |  | 70 |
| (B) Components | Polymer A | 50 | 40 | 50 | 50 | 50 |  |  |  |
|  | Polymer B |  |  |  |  |  |  |  |  |
|  | Polymer C |  |  |  |  |  |  |  |  |
|  | Polymer D |  |  |  |  |  |  |  |  |
|  | Polymer E |  |  |  |  |  |  |  |  |
|  | Polymer I |  |  |  |  |  |  |  | 50 |
| (C) Components | DIDP | 30 | 20 | 40 | 40 | 40 |  |  | 20 |
|  | HB-40 | 30 | 20 |  |  |  |  |  | 30 |
| (F) Components | PM-100 | 5 | 3 |  |  |  |  |  | 5 |
|  | HP-70 |  |  | 10 |  |  |  |  | 5 |
|  | T-30 |  |  |  | 10 |  |  |  | 5 |
|  | G125 |  |  |  |  | 10 |  |  | 5 |
| (G) Components | A-171 | 1 | 1 | 1 | 1 | 1 |  |  | 1 |
|  | A-1120 | 2 | 2 | 2 | 2 | 2 |  |  | 2 |
| Block copolymer | SBS |  |  |  |  |  | 10 | 10 |  |
| Filler | Calcium carbonate | 200 | 200 | 200 | 200 | 200 | 200 | 200 | 200 |
| Curing catalyst | U220 | 1 | 1 | 1 | 1 | 1 |  |  | 1 |
| Tensile properties | Tensile strength at break (MPa) | A | A | A | A | A | A | A | A |
|  | Elongation at break (%) | A | A | A | A | A | B | B | A |
| Workability |  | Good | Good | Good | Good | Good | Poor | Good | Good |
| Odor |  | Good | Good | Good | Good | Good | Poor | Poor | Poor |
| Curability |  | Good | Good | Good | Good | Good | Good | Poor | Good |
| Storage stability | Storage at 23° C. | B | B | A | A | A | C | A | A |
| Adhesion |  | A | A | A | A | A | B | B | A |

The curable compositions of Examples generated neither smoke and odor of asphalt nor solvent odor when working with the compositions concerned, and exhibited sufficient room-temperature curability, satisfactory adhesion to mortar, and dispersion stability reaching a satisfactory level. On the other hand, no compositions of Comparative Examples were found to result in a satisfactory balance between these properties.

Examples 14 to 26 and Comparative Examples 4 to 6

Comparative experiments were carried out on the (C) plasticizers. The results obtained are shown in Table 2.

TABLE 2

|  |  | Example 14 | Example 15 | Example 16 | Example 17 | Example 18 | Example 19 | Example 20 | Example 21 |
|---|---|---|---|---|---|---|---|---|---|
| (A) Components | Straight asphalt 1 | 70 | 50 | 70 | 70 | 70 | 70 | 70 | 70 |
|  | Blown asphalt |  |  |  |  |  |  |  |  |
|  | Cut-back asphalt |  |  |  |  |  |  |  |  |
|  | Coal tar |  |  |  |  |  |  |  |  |
| (B) Components | Polymer A | 50 | 50 |  |  |  |  |  |  |
|  | Polymer B |  |  | 50 |  |  |  | 20 |  |
|  | Polymer C |  |  |  | 50 |  |  | 30 |  |
|  | Polymer D |  |  |  |  | 50 |  |  |  |
|  | Polymer E |  |  |  |  |  | 50 |  |  |
|  | Polymer I |  |  |  |  |  |  |  | 50 |
| (C) Components | DIDP |  |  |  |  |  |  |  |  |
|  | Mesamoll II | 50 | 40 | 30 | 50 | 30 | 50 | 50 | 50 |
|  | HB-40 |  |  |  |  | 20 |  |  |  |
|  | Topcizer No. 3 |  |  |  |  |  |  |  |  |
| (F) Components | PM-100 | 5 | 5 | 5 |  | 5 | 5 | 5 | 5 |
|  | FTR-8100 |  |  |  | 5 |  |  |  |  |
| (G) Components | A-171 | 1 | 1 | 1 | 1 | 1 | 1 | 1 | 1 |
|  | A-1120 | 2 | 2 | 2 | 2 | 2 | 2 | 2 | 2 |
| Block copolymer | SBS |  |  |  |  |  |  |  |  |
| Fillers | Calcium carbonate | 200 | 200 | 200 | 100 | 200 | 200 | 200 | 200 |
|  | Fly ash balloon |  |  |  | 100 |  |  |  |  |
| Curing catalyst | U220 | 1 | 1 | 1 | 1 | 1 | 1 | 1 | 1 |
| Workability |  | Good | Good | Good | Good | Good | Good | Good | Good |
| Odor |  | Good | Good | Good | Good | Good | Good | Good | Good |
| Curability |  | Good | Good | Good | Good | Good | Good | Good | Good |
| Storage stability | Storage at 50° C. | A | A | A | A | A | A | A | A |
|  | Storage at 5° C. | A | A | A | A | A | A | A | A |
| Adhesion |  | A | A | A | A | A | A | A | A |

|  |  | Example 22 | Example 23 | Example 24 | Example 25 | Example 26 | Comp. ex. 4 | Comp. ex. 5 | Comp. ex. 6 |
|---|---|---|---|---|---|---|---|---|---|
| (A) Components | Straight asphalt 1 | 70 | 70 | 70 | 70 | 70 |  |  |  |
|  | Blown asphalt |  |  |  |  |  | 100 |  |  |
|  | Cut-back asphalt |  |  |  |  |  |  | 100 |  |
|  | Coal tar |  |  |  |  |  |  |  | 100 |
| (B) Components | Polymer A | 50 | 50 |  | 50 |  |  |  |  |
|  | Polymer B |  |  |  |  |  |  |  |  |
|  | Polymer C |  |  |  |  |  |  |  |  |
|  | Polymer D |  |  |  |  |  |  |  |  |
|  | Polymer E |  |  |  |  |  |  |  |  |
|  | Polymer I |  |  | 50 |  | 50 |  |  | 50 |
| (C) Components | DIDP | 50 |  |  |  |  |  |  |  |
|  | Mesamoll II |  |  |  |  |  |  |  | 50 |
|  | HB-40 |  |  |  |  |  |  |  |  |
|  | Topcizer No. 3 |  | 30 | 30 | 30 | 30 |  |  |  |
| (F) Components | PM-100 | 5 | 5 | 5 |  |  |  |  | 5 |
|  | FTR-8100 |  |  |  |  |  |  |  |  |
| (G) Components | A-171 | 1 | 1 | 1 | 1 | 1 |  |  | 1 |
|  | A-1120 | 2 | 2 | 2 | 2 | 2 |  |  | 2 |
| Block copolymer | SBS |  |  |  |  |  | 10 | 10 |  |
| Fillers | Calcium carbonate | 200 | 200 | 200 | 200 | 200 | 100 | 100 | 200 |
|  | Fly ash balloon |  |  |  |  |  | 100 | 100 |  |
| Curing catalyst | U220 | 1 | 1 | 1 | 1 | 1 |  |  | 1 |
| Workability |  | Good | Good | Good | Good | Good | Poor | Good | Good |
| Odor |  | Good | Good | Good | Good | Good | Poor | Poor | Poor |
| Curability |  | Good | Good | Good | Good | Good | Good | Poor | Good |
| Storage stability | Storage at 50° C. | B | A | A | A | A | C | A | A |
|  | Storage at 5° C. | B | A | A | A | A | C | A | A |
| Adhesion |  | A | A | A | A | A | C | C | A |

Examples 27 to 45 and Comparative Examples 7 to 10

Effects of addition of the (D) epoxy resin were investigated. The results obtained are shown in Tables 3 and 4.

TABLE 3

| | | Example 27 | Example 28 | Example 29 | Example 30 | Example 31 | Example 32 | Example 33 |
|---|---|---|---|---|---|---|---|---|
| (A) Components | Straight asphalt 1 | 70 | 70 | 50 | 70 | 50 | 70 | 70 |
| | Blown asphalt | | | | | | | |
| (B) Components | Polymer A | 50 | | | | | | |
| | Polymer B | | 50 | 50 | | | | 20 |
| | Polymer C | | | | 50 | | | 30 |
| | Polymer D | | | | | 50 | | |
| | Polymer E | | | | | | 50 | |
| | Polymer I | | | | | | | |
| (C) Components | Mesamoll II | 50 | 50 | | 50 | | 50 | 50 |
| | HB-40 | | | 60 | | 50 | | |
| (D) Component | Epicoat 828 | 20 | 20 | 20 | 20 | 20 | 20 | 20 |
| (F) Component | PM-100 | 5 | 5 | 5 | 5 | 5 | 5 | 5 |
| (G) Components | A-171 | 1 | 1 | 1 | 1 | 1 | 1 | 1 |
| | A-1120 | | | | | | | |
| | A-187 | 2.5 | 2.5 | 2.5 | 2.5 | 2.5 | 2.5 | 2.5 |
| Block copolymer | SBS | | | | | | | |
| Epoxy curing agents | H-30 | 10 | 10 | 10 | 10 | 10 | 10 | 10 |
| | TAP | | | | | | | |
| Water | | | | | | | | |
| Fillers | Calcium carbonate | 200 | 200 | 200 | 100 | 200 | 100 | 200 |
| | Fly ash balloon | | | | 100 | | 100 | |
| Curing catalyst | U220 | 1 | 1 | 1 | 1 | 1 | 1 | 1 |
| Workability | | Good | Good | Good | Good | Good | Good | Good |
| Odor | | Good | Good | Good | Good | Good | Good | Good |
| Curability | | Good | Good | Good | Good | Good | Good | Good |
| Tensile properties | Tensile strength at break (MPa) | A | A | A | A | A | A | A |
| | Elongation at break (%) | A | A | A | A | A | A | A |
| Storage stability | Storage at 50° C. | A | A | A | A | A | A | A |
| Water-resistant adhesion | | A | A | A | A | A | A | A |

| | | Example 34 | Example 35 | Example 36 | Example 37 | Comp. ex. 7 | Comp. ex. 8 |
|---|---|---|---|---|---|---|---|
| (A) Components | Straight asphalt 1 | 70 | 70 | 70 | 70 | | 70 |
| | Blown asphalt | | | | 100 | | |
| (B) Components | Polymer A | 50 | 50 | | | | |
| | Polymer B | | | | 50 | | |
| | Polymer C | | | | | | |
| | Polymer D | | | | | | |
| | Polymer E | | | | | | |
| | Polymer I | | | 50 | | | |
| (C) Components | Mesamoll II | 50 | 50 | 50 | 50 | | 60 |
| | HB-40 | | | | | | |
| (D) Component | Epicoat 828 | 20 | 100 | 20 | | | 150 |
| (F) Component | PM-100 | 5 | | 5 | 5 | | |
| (G) Components | A-171 | | 1 | 1 | 1 | | 1 |
| | A-1120 | 2 | | | 2 | | |
| | A-187 | | 2.5 | 2.5 | | | 2.5 |
| Block copolymer | SBS | | | | | 10 | |
| Epoxy curing agents | H-30 | | | 50 | 10 | | 75 |
| | TAP | 3 | | | | | |
| Water | | 0.2 | | | | | |
| Fillers | Calcium carbonate | 200 | 200 | 200 | 200 | 100 | 200 |
| | Fly ash balloon | | | | | 100 | |
| Curing catalyst | U220 | 1 | 1 | 1 | 1 | | 1 |
| Workability | | Good | Good | Good | Good | Poor | Good |
| Odor | | Good | Good | Good | Good | Poor | Good |
| Curability | | Good | Good | Good | Good | Good | Good |
| Tensile properties | Tensile strength at break (MPa) | A | A | A | A | C | A |
| | Elongation at break (%) | A | B | A | A | B | C |
| Storage stability | Storage at 50° C. | A | B | A | A | C | C |
| Water-resistant adhesion | | A | A | A | B | C | C |

TABLE 4

|  |  |  | Example 38 | Example 39 | Example 40 | Example 41 | Example 42 | Example 43 | Example 44 | Example 45 | Comp. ex. 9 | Comp. ex. 10 |
|---|---|---|---|---|---|---|---|---|---|---|---|---|
| A agents | (A) Component | Straight asphalt 1 | 40 | 40 | 25 | 40 | 25 | 40 | 40 | 40 |  |  |
|  | (B) Components | Polymer A | 50 |  |  |  |  |  |  |  | 50 |  |
|  |  | Polymer B |  | 50 | 50 |  |  |  | 20 |  |  |  |
|  |  | Polymer C |  |  |  | 50 |  |  | 30 |  |  |  |
|  |  | Polymer D |  |  |  |  | 50 |  |  |  |  |  |
|  |  | Polymer E |  |  |  |  |  | 50 |  |  |  |  |
|  |  | Polymer I |  |  |  |  |  |  |  | 50 |  | 50 |
|  | (C) Component | Mesamoll II | 25 | 25 | 25 | 25 | 25 | 25 | 25 | 25 | 25 | 25 |
|  | (F) Component | PM-100 | 5 | 5 | 5 | 5 | 5 | 5 | 5 | 5 |  |  |
|  | (G) Components | A-171 | 1 | 1 | 1 | 1 | 1 | 1 | 1 | 1 | 1 | 1 |
|  |  | A-1120 | 2 | 2 | 2 | 2 | 2 | 2 | 2 | 2 | 2 | 2 |
|  | Epoxy curing agent | TAP | 2 | 2 | 2 | 2 | 2 | 2 | 2 | 2 | 2 | 2 |
|  | Filler | Calcium carbonate | 100 | 100 | 100 | 100 | 100 | 100 | 100 | 100 | 100 | 100 |
| B agents | (A) Component | Straight asphalt 1 | 30 | 30 | 25 | 30 | 25 | 30 | 30 | 30 |  |  |
|  | (C) Component | Mesamoll II | 25 | 25 | 25 | 25 | 25 | 25 | 25 | 25 | 25 | 25 |
|  | (D) Component | Epicoat 828 | 20 | 20 | 20 | 20 | 20 | 20 | 20 | 20 | 20 | 20 |
|  | Filler | Calcium carbonate | 50 | 50 | 50 | 50 | 50 | 50 | 50 | 50 | 50 | 50 |
|  | Curing catalyst | U220 | 1 | 1 | 1 | 1 | 1 | 1 | 1 | 1 | 1 | 1 |
|  | Water-resistant adhesion |  | A | A | A | A | A | A | A | A | C | C |

Examples 46 to 54 and Comparative Example 11

Investigations were made on the (E) component, and the results obtained are shown in Table 5.

TABLE 5

|  |  | Example 46 | Example 47 | Example 48 | Example 49 | Example 50 | Example 51 | Example 52 | Example 53 | Example 54 | Comp. ex. 11 |
|---|---|---|---|---|---|---|---|---|---|---|---|
| (A) Components | Straight asphalt 1 | 70 | 70 | 50 | 70 | 50 | 70 | 70 | 70 | 70 |  |
|  | Blown asphalt |  |  |  |  |  |  |  |  |  | 100 |
| (B) Components | Polymer A | 56 |  |  |  |  |  |  |  | 80 |  |
|  | Polymer B |  | 56 | 56 | 40 |  |  | 28 |  |  |  |
|  | Polymer C |  |  |  | 56 |  |  | 28 |  |  |  |
|  | Polymer D |  |  |  |  | 56 |  |  |  |  |  |
|  | Polymer E |  |  |  |  |  | 56 |  |  |  |  |
|  | Polymer I |  |  |  |  |  |  |  | 56 |  |  |
| (C) Components | Mesamoll II | 50 | 50 |  | 45 | 50 |  | 50 | 50 | 50 |  |
|  | HB-40 |  |  | 50 |  | 40 |  |  |  |  |  |
| (E) Component | Polymer H | 24 | 24 | 24 | 24 | 24 | 24 | 24 | 24 |  |  |
| (F) Component | PM-100 | 8 | 8 | 8 | 8 | 8 | 8 | 8 | 8 | 8 |  |
| (G) Components | A-171 | 1 | 1 | 1 | 1 | 1 | 1 | 1 | 1 | 1 |  |
|  | A-1120 | 2 | 2 | 2 | 2 | 2 | 2 | 2 | 2 | 2 |  |
| Block copolymer | SBS |  |  |  |  |  |  |  |  |  | 10 |
| Ultraviolet absorber | TINUVIN 213 | 1 | 1 | 1 | 1 | 1 | 1 | 1 | 1 | 1 | 1 |
| Light stabilizer | SANOL LS765 | 1 | 1 | 1 | 1 | 1 | 1 | 1 | 1 | 1 | 1 |
| Fillers | Calcium carbonate | 130 | 130 | 130 | 100 | 130 | 100 | 130 | 130 | 130 | 100 |
|  | Fly ash balloon |  |  |  | 30 |  | 30 |  |  |  | 30 |
| Curing catalyst | U220 | 1 | 1 | 1 | 1 | 1 | 1 | 1 | 1 | 1 | 1 |
| Workability |  | Good | Good | Good | Good | Good | Good | Good | Good | Good | Poor |
| Odor |  | Good | Good | Good | Good | Good | Good | Good | Good | Good | Poor |
| Curability |  | Good | Good | Good | Good | Good | Good | Good | Good | Good | Good |
| Tensile properties | Tensile strength at break (MPa) | A | A | A | A | A | A | A | A | A | C |
|  | Elongation at break (%) | A | A | A | A | A | A | A | A | A | C |
| Storage stability | Storage at 50° C. | A | A | A | A | A | A | A | A | A | C |
| Weather resistance |  | A | A | A | A | A | A | A | A | B | B |

Examples 55 to 57 and Comparative Examples 12 and 13

Experiments were carried out on polymers having the group, $-NR^2-C(=O)-$, and the results obtained are shown in Table 6.

The adhesives of Examples exhibited a satisfactory adhesion strength under normal conditions, after soaking in water and after soaking in an aqueous solution of calcium hydroxide, revealing that these adhesives have sufficient adhesion and durability. On the other hand, the adhesives of Comparative Examples exhibited sufficient adhesion strength under

TABLE 6

|  |  | Example 55 | Example 56 | Example 57 | Comp. ex. 12 | Comp. ex. 13 |
|---|---|---|---|---|---|---|
| (A) Components | Straight asphalt 1 | 70 | 50 | 70 |  |  |
|  | Blown asphalt |  |  |  | 100 |  |
|  | Cut-back asphalt |  |  |  |  | 100 |
| (B) Components | Polymer F | 50 | 50 |  |  |  |
|  | Polymer G |  |  | 50 |  |  |
| (C) Components | Mesamoll II | 50 | 30 | 50 |  |  |
|  | HB-40 |  | 20 |  |  |  |
| (F) Component | PM-100 | 5 | 5 | 5 |  |  |
| (G) Components | A-171 | 1 | 1 | 1 |  |  |
|  | A-1120 | 2 | 2 | 2 |  |  |
| Block copolymer | SBS |  |  |  | 10 | 10 |
| Fillers | Calcium carbonate | 200 | 100 | 200 | 100 | 100 |
|  | Fly ash balloon |  | 100 |  | 100 | 100 |
| Curing catalyst | SCAT-1 | 2 | 2 | 2 |  |  |
| Workability |  | Good | Good | Good | Poor | Good |
| Odor |  | Good | Good | Good | Poor | Poor |
| Curability |  | Good | Good | Good | Good | Poor |
| Storage stability | Storage at 50° C. | A | A | A | C | A |
| Adhesion |  | A | A | A | C | C |

Examples 58 to 62 and Comparative Examples 14 to 16

Comparison of Performances as Adhesives for Tile

According to the compositions shown in Table 7, various blending materials were kneaded with a 5 L mixer to prepare the adhesives of Examples 58 to 62 and Comparative Examples 14 to 16.
The evaluation results obtained are shown in Table 7.

normal conditions, but exhibited adhesive strength significantly degraded by soaking in water.

Examples 63 to 68 and Comparative Examples 17, 1 and 18

Comparison of Performances as Waterproof Agents

TABLE 7

|  |  | Example 58 | Example 59 | Example 60 | Example 61 | Example 62 | Comp. ex. 14 | Comp. ex. 15 | Comp. ex. 16 |
|---|---|---|---|---|---|---|---|---|---|
| (A) Component | Straight asphalt 1 | 80 | 80 | 80 | 80 | 80 |  |  |  |
| (B) Components | Polymer I | 100 |  |  |  | 70 | 100 |  |  |
|  | Polymer B |  | 100 |  |  |  |  | 100 |  |
|  | Polymer F |  |  | 100 |  |  |  |  | 100 |
|  | Polymer G |  |  |  | 100 |  |  |  |  |
| (C) Components | Mesamoll II | 50 | 25 | 25 | 50 | 50 | 50 | 25 | 25 |
|  | HB-40 |  | 25 | 25 |  |  |  | 25 | 25 |
| (D) Component | Epicoat 828 | 10 | 10 | 10 | 10 | 10 | 10 | 10 | 10 |
| (E) Component | Polymer H |  |  |  |  | 30 |  |  |  |
| (F) Component | PM-100 | 10 | 10 | 10 | 10 | 10 |  |  |  |
| (G) Components | A-171 | 1 | 1 | 1 | 1 | 1 | 1 | 1 | 1 |
|  | A-187 | 3 | 3 | 3 | 3 | 3 | 3 | 3 | 3 |
| Fillers | Calcium carbonate | 100 | 100 | 100 | 100 | 100 | 100 | 100 | 100 |
|  | Sepiolite S | 5 | 5 | 5 | 5 | 5 | 5 | 5 | 5 |
|  | Silica sand | 100 | 100 | 100 | 100 | 100 | 100 | 100 | 100 |
| Curing catalyst | SCAT-1 | 1 | 1 | 1 | 1 | 1 | 1 | 1 | 1 |
| Epoxy resin curing agent | Epikure H-30 | 5 | 5 | 5 | 5 | 5 | 5 | 5 | 5 |
| Tile adhesion strength | Normal conditions (MPa) | 1.4 | 1.5 | 1.5 | 1.4 | 1.3 | 1.4 | 1.5 | 1.3 |
|  | After soaking in water (MPa) | 1.3 | 1.4 | 1.4 | 1.3 | 1.1 | 0.9 | 1.0 | 0.8 |
|  | After soaking in alkali (MPa) | 1.1 | 1.1 | 1.2 | 1.1 | 1.0 | 0.6 | 0.7 | 0.6 |
|  | Water-resistant retention ratio (%) | 93 | 93 | 93 | 93 | 85 | 64 | 67 | 62 |
|  | Alkali-resistant retention ratio (%) | 78 | 73 | 80 | 78 | 77 | 43 | 47 | 46 |

According to the compositions shown in Table 8, various blending materials were kneaded with a 5 L mixer to prepare the waterproof agents of Examples 63 to 68 and Comparative Examples 17, 1 and 18.

The evaluation results obtained are shown in Table 8.

Examples 69 to 74 and Comparative Examples 19 to 21

Comparison of Performances as Sealant Compositions

TABLE 8

|  |  | Example 63 | Example 64 | Example 65 | Example 66 | Example 67 | Example 68 | Comp. ex. 17 | Comp. ex. 1 | Comp. ex. 18 |
|---|---|---|---|---|---|---|---|---|---|---|
| (A) Components | Straight asphalt 1 | 140 | 140 | 140 | 140 | 140 | 140 | 20 | | |
|  | Blown asphalt | | | | | | | 80 | 100 | |
|  | Cut-back asphalt | | | | | | | | | 100 |
| (B) Components | Polymer I | 100 | | | | 70 | 100 | | | |
|  | Polymer B | | 100 | | | | | | | |
|  | Polymer F | | | 100 | | | | | | |
|  | Polymer G | | | | 100 | | | | | |
| (C) Components | Mesamoll II | 100 | 50 | 50 | 100 | 100 | 100 | | | |
|  | HB-40 | | 50 | 50 | | | | | | |
| (D) Component | Epicoat 828 | | | | | | 10 | | | |
| (E) Component | Polymer H | | | | | 30 | | | | |
| (F) Component | PM-100 | 10 | 10 | 10 | 10 | 10 | 10 | | | |
| (G) Components | A-171 | 1 | 1 | 1 | 1 | 1 | 1 | | | |
|  | A-1120 | 2 | 2 | 2 | 2 | 2 | | | | |
|  | A-187 | | | | | | 3 | | | |
| Block copolymer | SBS | | | | | | | 10 | 10 | 10 |
| Filler | Calcium carbonate | 200 | 200 | 200 | 200 | 200 | 200 | 200 | 200 | 200 |
| Curing catalyst | SCAT-1 | 1 | 1 | 1 | 1 | 1 | 1 | | | |
| Epoxy resin curing agent | Epikure H-30 | | | | | | 5 | | | |
| Workability | | Good | Good | Good | Good | Good | Good | Poor | Poor | Good |
| Odor | | Good | Good | Good | Good | Good | Good | Poor | Poor | Poor |
| Curability | | Good | Good | Good | Good | Good | Good | Good | Good | Poor |
| Storage stability | Storage at 50° C. | A | A | A | A | A | A | C | C | A |

The waterproof material compositions of Examples generated neither smoke and odor of asphalt nor solvent odor when working with the compositions concerned, and exhibited low viscosity and satisfactory workability, sufficient room-temperature curability, and storage stability reaching a satisfactory level. On the other hand, no compositions of Comparative Examples were found to result in a satisfactory balance between these properties.

According to the compositions shown in Table 9, various blending materials were kneaded with a 5 L mixer to prepare the sealant compositions of Examples 69 to 74 and Comparative Examples 19 to 21.

The evaluation results obtained are shown in Table 9.

TABLE 9

|  |  | Example 69 | Example 70 | Example 71 | Example 72 | Example 73 | Example 74 | Comp. ex. 19 | Comp. ex. 20 | Comp. ex. 21 |
|---|---|---|---|---|---|---|---|---|---|---|
| (A) Component | Straight asphalt 1 | 90 | 90 | 90 | 90 | 90 | 90 | | | |
| (B) Components | Polymer I | 100 | | | | 70 | 100 | 100 | | |
|  | Polymer B | | 100 | | | | | | 100 | |
|  | Polymer F | | | 100 | | | | | | 100 |
|  | Polymer G | | | | 100 | | | | | |
| (C) Components | Mesamoll II | 50 | 25 | 25 | 50 | 50 | 50 | 50 | 25 | 25 |
|  | HB-40 | | 25 | 25 | | | | | 25 | 25 |
| (D) Component | Epicoat 828 | | | | | | 10 | | | |
| (E) Component | Polymer H | | | | | 30 | | | | |
| (F) Component | PM-100 | 10 | 10 | 10 | 10 | 10 | 10 | 10 | 10 | 10 |
| (G) Components | A-171 | 1 | 1 | 1 | 1 | 1 | 1 | 1 | 1 | 1 |
|  | A-1120 | 2 | 2 | 2 | 2 | 2 | | 2 | 2 | 2 |
|  | A-187 | | | | | | 3 | | | |
| Filler | Calcium carbonate | 150 | 150 | 150 | 150 | 150 | 150 | 150 | 150 | 150 |
| Antioxidant | IRGANOX 245 | 1 | 1 | 1 | 1 | 1 | 1 | 1 | 1 | 1 |
| Ultraviolet absorber | TINUVIN 213 | 1 | 1 | 1 | 1 | 1 | 1 | 1 | 1 | 1 |
| Light stabilizer | SANOL LS765 | 1 | 1 | 1 | 1 | 1 | 1 | 1 | 1 | 1 |
| Curing catalyst | SCAT-1 | 1 | 1 | 1 | 1 | 1 | 1 | 1 | 1 | 1 |
| Epoxy resin curing agent | Epikure H-30 | | | | | | 5 | | | |
| Weather resistance | | B | B | B | B | A | B | C | C | C |
| Adhesion | | A | A | A | A | A | A | C | C | C |

The sealant compositions of Examples exhibited satisfactory water-resistant adhesion and weather resistance, but the compositions of Comparative Examples all exhibited insufficient results.

Examples 75 to 80 and Comparative Examples 22 to 24

Comparison of Performances as Damping Materials

According to the compositions shown in Table 10, various blending materials were kneaded with a 5 L mixer to prepare the damping materials of Examples 75 to 80 and Comparative Examples 22 to 24.

The evaluation results obtained are shown in Table 10.

TABLE 10

|  |  | Example 75 | Example 76 | Example 77 | Example 78 | Example 79 | Example 80 | Comp. ex. 22 | Comp. ex. 23 | Comp. ex. 24 |
|---|---|---|---|---|---|---|---|---|---|---|
| (A) Components | Straight asphalt 1 | 140 | 140 | 140 | 140 | 140 | 140 | 100 |  | 30 |
|  | Blown asphalt |  |  |  |  |  |  |  | 100 | 70 |
| (B) Components | Polymer I | 100 |  |  |  | 70 | 100 |  |  |  |
|  | Polymer B |  | 100 |  |  |  |  |  |  |  |
|  | Polymer F |  |  | 100 |  |  |  |  |  |  |
|  | Polymer G |  |  |  | 100 |  |  |  |  |  |
| (C) Components | Mesamoll II | 50 | 30 | 30 | 50 | 50 | 50 |  |  |  |
|  | HB-40 |  | 20 | 20 |  |  |  |  |  |  |
| (D) Component | Epicoat 828 |  |  |  |  |  | 10 |  |  |  |
| (E) Component | Polymer H |  |  |  |  | 30 |  |  |  |  |
| (F) Component | PM-100 | 10 | 10 | 10 | 10 | 10 | 10 |  |  |  |
| (G) Components | A-171 | 1 | 1 | 1 | 1 | 1 | 1 |  |  |  |
|  | A-1120 | 2 | 2 | 2 | 2 | 2 |  |  |  |  |
|  | A-187 |  |  |  |  |  | 3 |  |  |  |
| Rubber component | SBR |  |  |  |  |  |  | 15 | 15 | 15 |
| Fillers | Calcium carbonate | 150 | 150 | 150 | 150 | 150 | 150 | 150 | 150 | 150 |
|  | Talc | 50 | 50 | 50 | 50 | 50 | 50 | 50 | 50 | 50 |
| Curing catalyst | SCAT-1 | 1 | 1 | 1 | 1 | 1 | 1 | 1 |  |  |
| Epoxy resin curing agent | Epikure H-30 |  |  |  |  |  | 5 |  |  |  |
| Workability |  | Good | Good | Good | Good | Good | Good | Poor | Poor | Poor |
| Odor |  | Good | Good | Good | Good | Good | Good | Poor | Poor | Poor |
| Curability |  | Good | Good | Good | Good | Good | Good | Good | Good | Good |
| Storage stability |  | A | A | A | A | A | A | C | C | C |

The damping materials of Examples require no melting by heating when working therewith and are free from a problem involving thermal hydraulic property, exhibited low viscosity and satisfactory workability, sufficient room-temperature curability, and storage stability reaching a satisfactory level.

(Blending Examples of Road Pavement Materials)

Table 11 shows the blending examples for the cases where the curable compositions of the present invention are used for road pavement materials.

TABLE 11

| (A) Component | Straight asphalt | 140 | 140 | 140 | 140 | 140 | 140 |
|---|---|---|---|---|---|---|---|
| (B) Components | Polymer I | 100 |  |  |  | 70 | 100 |
|  | Polymer B |  | 100 |  |  |  |  |
|  | Polymer F |  |  | 100 |  |  |  |
|  | Polymer G |  |  |  | 100 |  |  |
| (C) Components | Mesamoll II | 50 | 30 | 30 | 50 | 50 | 50 |
|  | HB-40 |  | 20 | 20 |  |  |  |
| (D) Component | Epicoat 828 |  |  |  |  |  | 10 |
| (E) Component | Polymer H |  |  |  |  | 30 |  |
| (F) Component | PM-100 | 10 | 10 | 10 | 10 | 10 | 10 |
| (G) Components | A-171 | 1 | 1 | 1 | 1 | 1 | 1 |
|  | A-1120 | 2 | 2 | 2 | 2 | 2 |  |
|  | A-187 |  |  |  |  |  | 3 |

TABLE 11-continued

| Aggregate |  | 200 | 200 | 200 | 200 | 200 | 200 |
|---|---|---|---|---|---|---|---|
| Curing catalyst | SCAT-1 | 1 | 1 | 1 | 1 | 1 | 1 |
| Epoxy resin curing agent | Epikure H-30 |  |  |  |  |  | 5 |

What is claimed is:

1. A curable composition comprising:
   (A) a natural asphalt and/or petroleum asphalt, and
   (B) a polyoxyalkylene polymer having one or more reactive silicon groups represented by the following general formula (1):

$$-Si(R^1_{3-a})X_a- \quad (1)$$

wherein $R^1$ represents an alkyl group having 1 to 20 carbon atoms, an aryl group having 6 to 20 carbon atoms, an aralkyl group having 7 to 20 carbon atoms or a triorganosiloxy group represented by $(R'O)_3Si-$, where, when two $R^1$s are present, they may be the same or different, and R' is a monovalent hydrocarbon group having 1 to 20 carbon atoms, and three R's may be the same or different; X represents a hydroxy group or a hydrolyzable group, where, when two or more Xs are present, they may be the same or different; and a represents 1, 2 or 3; and wherein the (B) component has one or more groups represented by the following general formula (4):

$$-NR^2-C(=O)- \quad (4)$$

where $R^2$ is a hydrogen atom, an alkyl group having 1 to 20 carbon atoms, an aryl group having 6 to 20 carbon atoms, or an aralkyl group having 7 to 20 carbon atoms.

2. The curable composition according to claim 1, wherein the main chain skeleton of the (B) component is polyoxypropylene.

3. The curable composition according to claim 1, comprising (D) an epoxy resin.

4. The curable composition according to claim 3, wherein the content of the (D) component epoxy resin is 5 to 120 parts by weight in relation to 100 parts by weight of the (A) component.

5. The curable composition according to claim 1, comprising (E) an alkyl (meth)acrylate polymer.

6. A one-component curable composition, comprising the curable composition according to claim 1.

7. An adhesive for tile, comprising the curable composition according to claim 1.

8. A waterproof material, comprising the curable composition according to claim 1.

9. A road pavement material, comprising the curable composition according to claim 1.

10. A sealant, comprising the curable composition according to claim 1.

11. A damping material, comprising the curable composition according to claim 1.

12. A curable composition comprising:
(A) a natural asphalt and/or petroleum asphalt;
(B) a polyoxyalkylene polymer having one or more reactive silicon groups represented by the following general formula (1):

$$—Si(R^1{}_{3-a})X_a \qquad (1)$$

wherein $R^1$ represents an alkyl group having 1 to 20 carbon atoms, an aryl group having 6 to 20 carbon atoms, an aralkyl group having 7 to 20 carbon atoms or a triorganosiloxy group represented by $(R'O)_3Si—$, where, when two $R^1$s are present, they may be the same or different, and R' is a monovalent hydrocarbon group having 1 to 20 carbon atoms, and three R's may be the same or different; X represents a hydroxy group or a hydrolyzable group, where, when two or more Xs are present, they may be the same or different; and a represents 1, 2 or 3; and
(C) a plasticizer which is a sulfonate compound or a sulfonamide compound.

13. The curable composition according to claim 12, wherein the main chain skeleton of the (B) component is polyoxypropylene.

14. The curable composition according to claim 12, wherein the (B) component has at least two groups represented by the following general formula (4):

$$—NR^2—C(=O)— \qquad (4)$$

where $R^2$ is a hydrogen atom, an alkyl group having 1 to 20 carbon atoms, an aryl group having 6 to 20 carbon atoms, or an aralkyl group having 7 to 20 carbon atoms, per molecule.

15. The curable composition according to claim 12, further comprising (D) an epoxy resin.

16. The curable composition according to claim 15, wherein the content of the (D) component epoxy resin is 5 to 120 parts by weight in relation to 100 parts by weight of the (A) component.

17. The curable composition according to claim 12, further comprising (E) an alkyl (meth)acrylate polymer.

18. A one-component curable composition, comprising the curable composition according to claim 12.

19. An adhesive for tile, comprising the curable composition according to claim 12.

20. A waterproof material, comprising the curable composition according to claim 12.

21. A road pavement material, comprising the curable composition according to claim 12.

22. A sealant, comprising the curable composition according to claim 12.

23. A damping material, comprising the curable composition according to claim 12.

24. A curable composition comprising:
(A) a natural asphalt and/or petroleum asphalt;
(B) a polyoxyalkylene polymer having one or more reactive silicon groups represented by the following general formula (1):

$$—Si(R^1{}_{3-a})X_a \qquad (1)$$

wherein $R^1$ represents an alkyl group having 1 to 20 carbon atoms, an aryl group having 6 to 20 carbon atoms, an aralkyl group having 7 to 20 carbon atoms or a triorganosiloxy group represented by $(R'O)_3Si—$, where, when two $R^1$s are present, they may be the same or different, and R' is a monovalent hydrocarbon group having 1 to 20 carbon atoms, and three R's may be the same or different; X represents a hydroxy group or a hydrolyzable group, where, when two or more Xs are present, they may be the same or different; and a represents 1, 2 or 3;
(C) a plasticizer; and
(F) a tackifier resin,
wherein when the sum of the contents of the (A), (B), (C) and (F) components is represented as 100 parts by weight, the contents of the (A), (B), (C) and (F) components are 30-60, 25-55, 15-50 and 1-30 parts by weight, respectively.

25. The curable composition according to claim 24, wherein the main chain skeleton of the (B) component is polyoxypropylene.

26. The curable composition according to claim 24, wherein the introduction ratio (as derived from $^1$H—NMR analysis) of the reactive silicon group introduced into the molecular terminals of the (B) component is 60% or more, and the number average molecular weight (based on GPC analysis, relative to polystyrene standard) of the (B) component is 5,000 or more.

27. The curable composition according to claim 24, further comprising (G) a silane coupling agent.

28. The curable composition according to claim 27, wherein the (G) component is a silane coupling agent containing one or more amino groups per molecule.

29. The curable composition according to claim 26, wherein the introduction ratio (as derived from $^1$H—NMR analysis) of the reactive silicon group introduced into the molecular terminals of the (B) component is 75% or more.

30. The curable composition according to claim 26, wherein the (B) component is a mixture composed of a reactive silicon group-containing polyoxyalkylene polymer having an introduction ratio (as derived from $^1$H—NMR analysis) of the reactive silicon group introduced into the molecular terminals thereof equal to 75% or more and less than 85% and a reactive silicon group-containing polyoxyalkylene polymer having an introduction ratio (as derived from $^1$H—NMR analysis) of the reactive silicon group introduced into the molecular terminals thereof is 85% or more.

31. The curable composition according to claim 26, wherein the introduction ratio (as derived from $^1$H—NMR analysis) of the reactive silicon group introduced into the molecular terminals of the (B) component is 85% or more.

32. The curable composition according to claim 26, wherein the number average molecular weight (based on GPC analysis, relative to polystyrene standard) of the (B) component is 10,000 or more.

33. The curable composition according to claim 24, wherein the (B) component has one or more reactive silicon

groups represented by the following general formula (2) and/or the following general formula (3):

$$-Si(R^1)X_2 \quad (2)$$

where $R^1$ and X are the same as described above, and $$-SiX_3 \quad (3)$$

where X is the same as described above.

34. The curable composition according to claim 24, wherein the (B) component has at least two groups represented by the following general formula (4):

$$-NR^2-C(=O)- \quad (4)$$

where $R^2$ is a hydrogen atom, an alkyl group having 1 to 20 carbon atoms, an aryl group having 6 to 20 carbon atoms, or an aralkyl group having 7 to 20 carbon atoms, per molecule.

35. The curable composition according to claim 24, wherein the (C) component plasticizer is an aromatic oligomer or a completely or partially hydrogenated product of the aromatic oligomer.

36. The curable composition according to claim 24, further comprising (D) an epoxy resin.

37. The curable composition according to claim 36, wherein the content of the (D) component epoxy resin is 5 to 120 parts by weight in relation to 100 parts by weight of the (A) component.

38. The curable composition according to claim 24, further comprising (E) an alkyl (meth)acrylate polymer.

39. The curable composition according to claim 38, wherein the molecular chain of the (E) component alkyl (meth)acrylate polymer is a copolymer comprising (a) alkyl (meth)acrylate monomer units having an alkyl group having 1 to 8 carbon atoms and (b) alkyl (meth)acrylate monomer units having an alkyl group having 10 or more carbon atoms.

40. The curable composition according to claim 38, wherein the (E) component alkyl (meth)acrylate polymer is a polymer having one or more reactive silicon groups represented by the above described general formula (1).

41. The curable composition according to claim 24, wherein the (F) tackifier resin is a tackifier resin modified with phenol and/or alkylphenol.

42. The curable composition according to claim 24, wherein 10 parts by weight or less of asphaltene is contained in 100 parts by weight of the (A) component.

43. The curable composition according to claim 24, wherein said curable composition is cured by aging at 23° C. for 3 days and then at 50° C. for 4 days to form a 3-mm thick sheet-like specimen, and said specimen is subjected to a tensile test in compliance with JIS K 6251, resulting in a tensile strength at break of 0.4 MPa or more and an elongation at break of 50% or more.

44. A one-component curable composition, comprising the curable composition according to claim 24.

45. An adhesive for tile, comprising the curable composition according to claim 24.

46. A waterproof material, comprising the curable composition according to claim 24.

47. A road pavement material, comprising the curable composition according to claim 24.

48. A sealant, comprising the curable composition according to claim 24.

49. A damping material, comprising the curable composition according to claim 24.

* * * * *